(12) United States Patent
Ono et al.

(10) Patent No.: US 8,339,725 B2
(45) Date of Patent: Dec. 25, 2012

(54) MAGNETIC HEAD SLIDER AND MAGNETIC DISC DRIVE

(75) Inventors: Kyosuke Ono, Hachioji (JP); Irizo Naniwa, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/742,270

(22) PCT Filed: Dec. 4, 2008

(86) PCT No.: PCT/JP2008/072026
§ 371 (c)(1),
(2), (4) Date: Oct. 8, 2010

(87) PCT Pub. No.: WO2009/087841
PCT Pub. Date: Jul. 16, 2009

(65) Prior Publication Data
US 2011/0043942 A1 Feb. 24, 2011

(30) Foreign Application Priority Data
Jan. 11, 2008 (JP) ................................. 2008-005011

(51) Int. Cl.
*G11B 21/02* (2006.01)
(52) U.S. Cl. .......................................................... 360/75
(58) Field of Classification Search .................. None
See application file for complete search history.

(56) References Cited

U.S. PATENT DOCUMENTS

| 7,375,915 B1 * | 5/2008 | Schreck et al. ............ 360/77.02 |
| 7,525,752 B2 * | 4/2009 | Satoh et al. .................... 360/75 |
| 7,542,243 B2 * | 6/2009 | Lou et al. ................... 360/294.7 |
| 7,558,022 B2 * | 7/2009 | Kurita et al. ............... 360/234.4 |
| 7,626,779 B2 * | 12/2009 | Kuwahara ........................ 360/75 |
| 7,777,990 B2 | 8/2010 | Shiramatsu et al. |
| 2004/0165311 A1 | 8/2004 | Yamanaka et al. |

FOREIGN PATENT DOCUMENTS

| CN | 1877700 | 12/2006 |
| JP | 9-231538 | 9/1997 |
| JP | 10-293979 | 11/1998 |
| JP | 2000-348321 | 12/2000 |
| JP | 2001-006305 | 1/2001 |
| JP | 2004-241092 | 8/2004 |
| JP | 2004-259379 | 9/2004 |
| JP | 2005-276284 | 10/2005 |
| JP | 2006-344270 | 12/2006 |

OTHER PUBLICATIONS

Japanese Office Action; Application No. 2008-005011; Date of issued: Sep. 20, 2012; Mailing Date: Sep. 25, 2012.

* cited by examiner

*Primary Examiner* — K. Wong
(74) *Attorney, Agent, or Firm* — Antonelli, Terry, Stout & Kraus, LLP.

(57) ABSTRACT

The invention provides a magnetic head slider and a magnetic disc drive which can position at a high precision and in a simple manner. A magnetic head slider (4) includes a recording and reproducing element (20) writing and reading data, a heat generating element (21) arranged at least in one side of directions (that is, a width direction of the magnetic head slider (4)) corresponding to a width direction of a recording track with respect to the recording and reproducing element (20), and generating heat on the basis of a current application, and a member (25) interposed at least between the recording and reproducing element (20) and the heat generating element (21) and expanding in correspondence to the heat generation of the heat generating element (21).

17 Claims, 15 Drawing Sheets

MAGNETIC HEAD SLIDER AND MAGNETIC DISC DRIVE

INCORPORATION BY REFERENCE

The present patent application claims priority of Japanese Patent Application No. 2008-005011 which was filed on Jan. 11, 2008, and incorporates the contents into the present application by reference.

BACKGROUND OF THE INVENTION (1) Field of the Invention

The present invention relates to a magnetic head slider and a magnetic disc drive.

(2) Description of Related Art

In a magnetic disc drive such as a hard disc or the like, a servo data is recorded along a recording track formed in the magnetic disc, and the servo data is read by a magnetic head slider flying above the magnetic disc. The magnetic head slider is supported by a leading end of an arm shaped head suspension, and relatively moves with respect to the magnetic disc by the driving operation of a voice coil motor. Accordingly, the magnetic disc drive carries out a positioning control making the magnetic head slider follow to a target track, by driving the voice coil motor in correspondence to the read servo data.

In the magnetic disc drive mentioned above, in order to improve a track density of the magnetic disc, it is necessary to enhance a servo band width of the positioning control so as to make a precision of the positioning of the magnetic head slider high. However, due to existence of a resonance frequency of the head suspension transmitting the motion of the voice coil motor to the magnetic head slider, it is hard to enhance the servo band width of the positioning control.

In order to solve the problem, there has been proposed a so-called two-stage actuator type magnetic disc drive, in which a micro actuator is provided at a position which is closer to the magnetic head slider than the voice coil motor. The micro actuator is provided in a midstream of the head suspension, or between the head suspension and the magnetic head slider, and achieves a high-precision positioning by finely positioning the magnetic head slider.

Further, a technique for incorporating a piezo element as a micro actuator into a magnetic head slider is disclosed in FIG. 23 of patent document 1 (JP-A-10-293979). In this magnetic head slider, a tabular piezo element is pinched between a slider substrate and an element substrate including a recording and reproducing element, and the element substrate including the recording and reproducing element is finely moved with respect to the slider substrate, by driving the piezo element.

However, in the case that the piezo element is used as a micro actuator, it is necessary to raise the power voltage driving the piezo element, and a structure of the apparatus becomes complicated. Further, incorporating the piezo element into the magnetic head slider has a lot of problems in manufacturing, and has not been put to practical use yet.

BRIEF SUMMARY OF THE INVENTION

The present invention is made by taking the practical manufacturing condition into consideration, and one of objects of the present invention is to provide a magnetic head slider and a magnetic disc drive which can position at a high precision and in a simple manner.

In order to achieve the object mentioned above, in accordance with the present invention, there is provided a magnetic head slider flying above a rotating magnetic disc and writing and reading data, comprising:

a recording and reproducing element writing and reading the data;

a heat generating element arranged in one side in a width direction of the magnetic head slider with respect to the recording and reproducing element and generating heat on the basis of a current application; and a member interposed at least between the recording and reproducing element and the heat generating element, expanding in correspondence to the heat generation of the heat generating element, and transmitting the thermal expansion of the material surrounding the heat generating element.

Further, in accordance with one aspect of the present invention, a flying surface opposed to the magnetic disc is constructed by a plurality of surfaces having different depths from each other, and including at least a step bearing surface, a shallow groove surface and a deep groove surface, and a position at a time of projecting the heat generating element to the flying surface is included in a surface which is equal to or deeper than the shallow groove surface.

This aspect may be structured such that the position at a time of projecting the heat generating element to the flying surface is included in a surface which is equal to or deeper than the shallow groove surface and is shallower than the deep groove surface.

Further, in accordance with one aspect of the present invention, the heat generating element is constructed by a thin film resistor.

Further, in accordance with one aspect of the present invention, the magnetic head slider includes a slider substrate, and a thin film laminated portion formed in an end portion close to an air outflow side of the slider substrate, and the recording and reproducing element and the heat generating element are formed within the thin film laminated portion.

In this aspect, the heat generating element may be formed in the same layer as the layer including at least a part of the recording and reproducing element in the thin film laminated portion.

Further, in accordance with one aspect of the present invention, a flying surface opposed to the magnetic disc is constructed by a plurality of surfaces having different depths from each other, and a position at a time of projecting the heat generating element to the flying surface is included in a surface which is 150 nm or more deeper from a surface which comes closest to the magnetic disc.

Further, in accordance with one aspect of the present invention, a distance between the recording and reproducing element and the heat generating element along the width direction is equal to or more than 10 μm and equal to or less than 100 μm.

Further, in accordance with one aspect of the present invention, the heat generating element has a flat shape extending in the width direction.

Further, in accordance with one aspect of the present invention, a member which is outer side of the heat generating element with respect to the recording and reproducing element is harder to be deformed than a member which is interposed between the recording and reproducing element and the heat generating element.

Further, in accordance with one aspect of the present invention, a member which is in an opposite side to the heat generating element with respect to the recording and reproducing element is more easily deformed than a member which is interposed between the recording and reproducing element and the heat generating element.

Further, in accordance with one aspect of the present invention, the recording and reproducing element is arranged in an end portion of the width direction.

Next, in accordance with the present invention, there is provided a magnetic head slider flying above a rotating magnetic disc and writing and reading data, comprising:

a recording and reproducing element writing and reading the data;

a plurality of heat generating elements respectively arranged in both side in a width direction of the magnetic head slider with respect to the recording and reproducing element and generating heat on the basis of a current application; and a member interposed at least between the recording and reproducing element and each of the heat generating elements, expanding in correspondence to the heat generation of each of the heat generating elements, and transmitting the thermal expansion of the material surrounding the heat generating element, wherein a flying surface opposed to the magnetic disc is constructed by a plurality of surfaces having different depths from each other, and including at least a step bearing surface, a shallow groove surface and a deep groove surface, and each of positions at a time of projecting each of the heat generating element to the flying surface is included in a surface which is equal to or deeper than the shallow groove surface.

Further, in accordance with one aspect of the present invention, each of the positions at a time of projecting each of the heat generating elements to the flying surface is included in a surface which is equal to or deeper than the shallow groove surface and is shallower than the deep groove surface.

Further, in accordance with one aspect of the present invention, a flying surface opposed to the magnetic disc is constructed by a plurality of surfaces having different depths from each other, and each of positions at a time of projecting each of the heat generating elements to the flying surface is included in a surface which is 150 nm or more deeper from a surface which comes closest to the magnetic disc.

Next, in accordance with the present invention, there is provided a magnetic disc drive comprising:

a magnetic disc in which data is recorded along a track;

a disc actuator rotating the magnetic disc;

a magnetic head slider flying above the rotating magnetic disc and writing and reading the data, the magnetic head slider including a recording and reproducing element writing and reading the data, a heat generating element arranged at least in one side in a width direction of the track with respect to the recording and reproducing element and generating heat on the basis of a current application, a member interposed at least between the recording and reproducing element and the heat generating element, expanding in correspondence to the heat generation of the heat generating element, and transmitting the thermal expansion of the material surrounding the heat generating element;

a head suspension supporting the magnetic head slider;

a head actuator driving the head suspension so as to relatively move the magnetic head slider with respect to the magnetic disc;

a calculation circuit calculating a position error of the recording and reproducing element with respect to the track on the basis of the data read by the recording and reproducing element;

a coarse motion control and track following control circuit driving the head actuator in correspondence to the position error of the recording and reproducing element; and a fine tracking motion control circuit exciting the heat generating element in correspondence to the position error of the recording and reproducing element.

Further, in accordance with one aspect of the present invention, the fine tracking motion control circuit controls an amount of electric current or an amount of electric power of the heat generating element.

Further, in accordance with one aspect of the present invention, the fine tracking motion control circuit includes a compensator compensating a time lag of the displacement of the recording and reproducing element with respect to the current application to the heat generating element.

Further, in accordance with one aspect of the present invention, the fine tracking motion control circuit increases and decreases an amount of electric current or an amount of electric power of the heat generating element from a reference amount of electric current or a reference amount of electric power, in correspondence to a position error of the recording and reproducing element.

Further, in accordance with one aspect of the present invention, the heat generating element is arranged in each of both sides in the width direction of the track with respect to the recording and reproducing element, and the fine tracking motion control circuit selectively excites the plurality of heat generating elements in correspondence to the position error of the recording and reproducing element.

Further, in accordance with one aspect of the present invention, the magnetic disc drive further includes a micro actuator regulating a position of the magnetic head slider with respect to the head suspension, and an intermediate fine tracking motion control circuit driving the micro actuator in correspondence to the position error of the recording and reproducing element.

EFFECT OF THE INVENTION

In accordance with the present invention, since it is possible to finely position the recording and reproducing element in a corresponding direction (in other words, the width direction of the magnetic head slider) to the width direction of the track, by thermally expanding the member interposed between the recording and reproducing element and the heat generating element, it is possible to position at a high precision and in a simple manner.

The other objects, features and advantages of the present invention will be apparent from the following description of embodiments in accordance with the present invention with reference to the accompanying drawings.

DETAILED DESCRIPTION OF THE INVENTION

A description will be given of an embodiment in accordance with the present invention with reference to the accompanying drawings.

Figure 1:
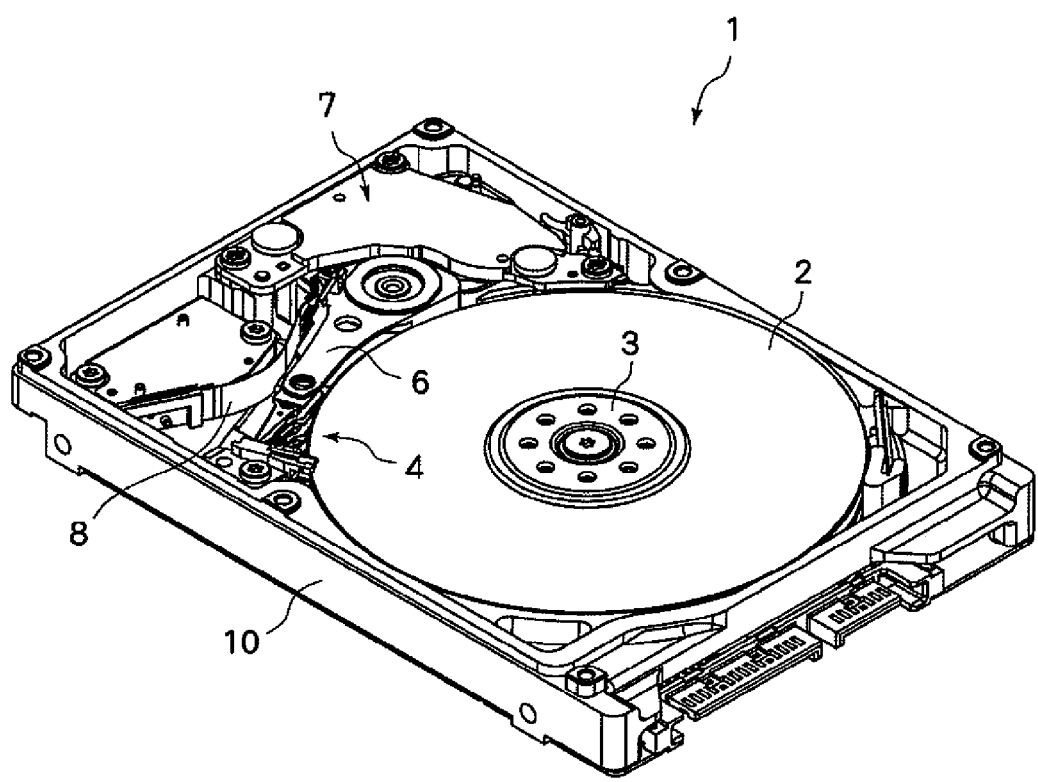
FIG. 1 is a perspective view showing an example of a structure of a magnetic disc drive in accordance with one embodiment of the present invention.

FIG. 1 shows a perspective view of a magnetic disc drive 1 in accordance with an embodiment of the present invention. The magnetic disc drive 1 has a magnetic disc 2, a head suspension 6 and others within a casing 10 (DE: a disc enclosure). In this case, in the drawing, an illustration of a cover corresponding to a part of the disc enclosure 10 is omitted.

The magnetic disc 2 is attached to a spindle motor 3 serving as a disc actuator. A plurality of concentrically arranged recording tracks (not shown) are formed in the magnetic disc 2, and the servo data is written at a predetermined cycle in each of the tracks. The servo data includes an address data and a burst signal.

The head suspension 6 is supported adjacent to the magnetic disc 2. A magnetic head slider 4 in accordance with one embodiment of the present invention is supported to a leading end portion of the head suspension 6. The magnetic head slider 4 comes close to and flies above the rotating magnetic disc 2, and writes and reads the data.

On the other hand, a rear end portion of the head suspension 6 is provided with a voice coil motor 7 serving as a head actuator. The voice coil motor 7 drives so as to oscillate the head suspension 6, and moves the magnetic head slider 4 approximately in a radial direction of the magnetic disc 2.

The magnetic head slider 4 and the voice coil motor 7 are electrically connected to a circuit board (not shown) provided in a back side of the disc enclosure 10 via flexible printed circuits (FPC) 8 attached to the head suspension 6.

[First Embodiment of Magnetic Head Slider]

Figure 2:
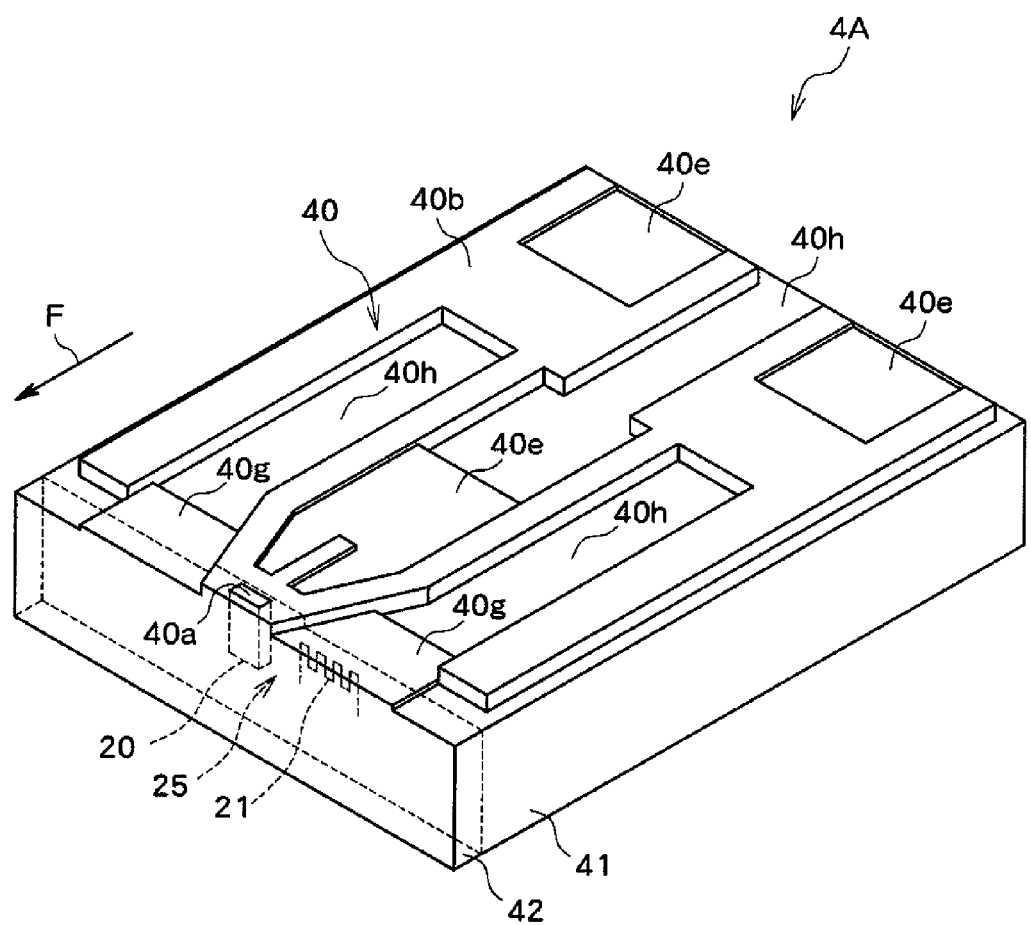
FIG. 2 is a perspective view of a magnetic head slider in accordance with one embodiment of the present invention.
Figure 3:
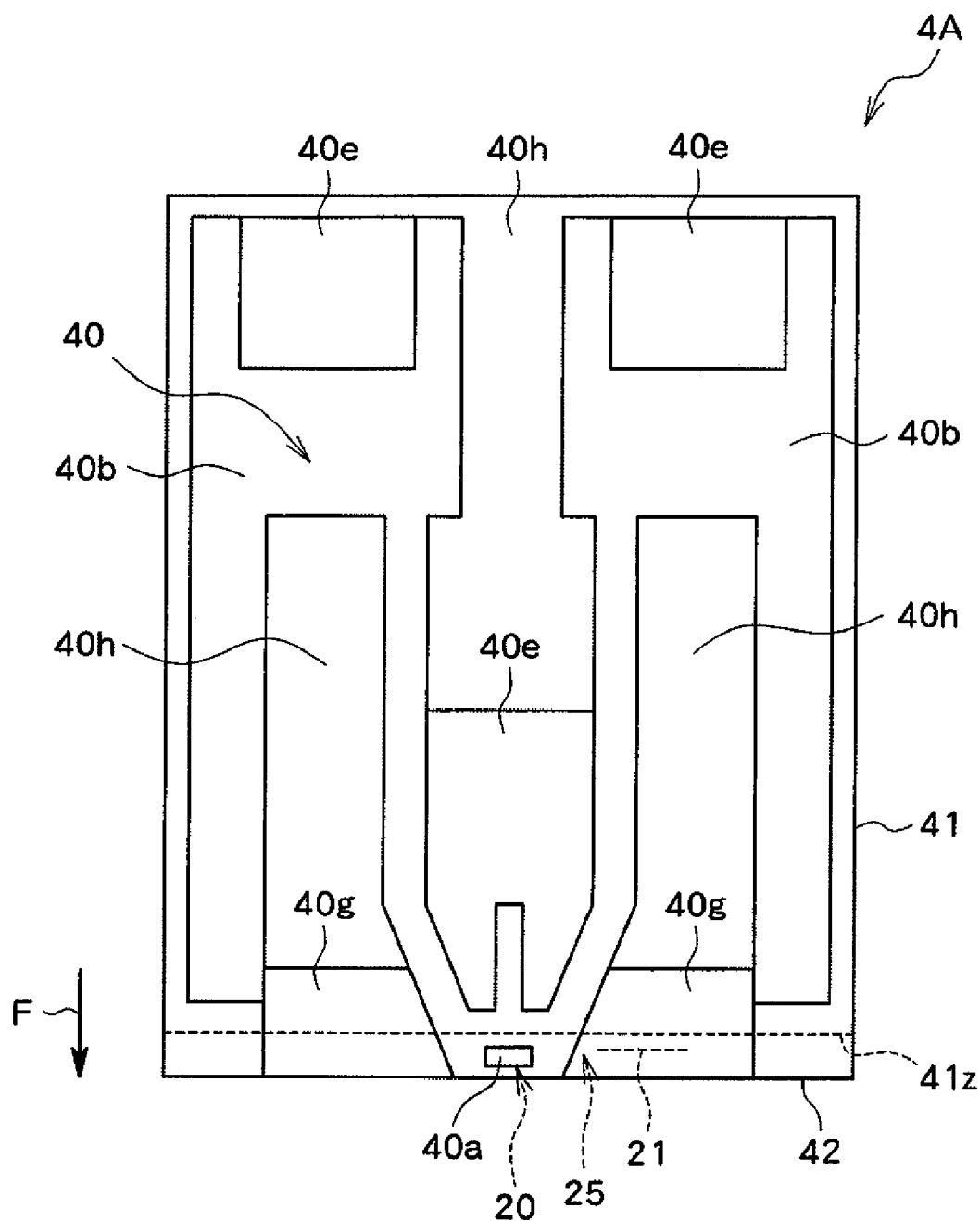
FIG. 3 is a plan view of the magnetic head slider in accordance with one embodiment of the present invention.
Figure 4:
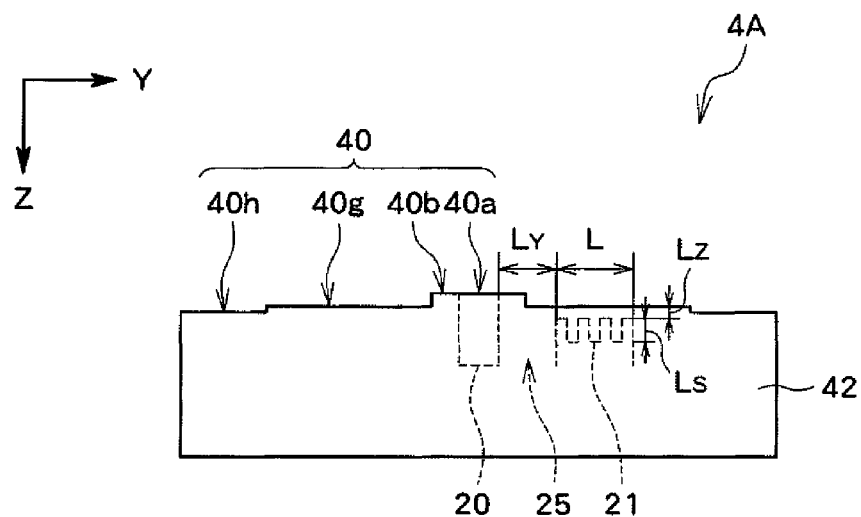
FIG. 4 is a front elevational view of the magnetic head slider in accordance with one embodiment of the present invention.

FIGS. 2 to 4 show a perspective view, a plan view and a front elevational view of a first embodiment (hereinafter, refer to as a magnetic head slider 4A) of the magnetic head slider 4.

In this case, an arrow F in FIGS. 2 and 3 expresses a direction of an air flow generated by a rotation of the magnetic disc 2. The direction F of the air flow corresponds to an elongating direction of the recording track formed in the magnetic disc 2. Further, the direction F of the air flow extends approximately along a longitudinal direction of the magnetic head slider 4A, and changes about ±10 degree to the maximum in correspondence to a radial position of the magnetic disc 2 at which the magnetic head slider 4A is positioned.

Further, a direction Y in FIG. 4 expresses a width direction (hereinafter, refer to as a slider width direction) of the magnetic head slider 4A. The slider width direction corresponds to a width direction of the recording track formed in the magnetic disc 2. Further, a direction Z in FIG. 4 expresses a thickness direction of the magnetic head slider 4A. The thickness direction corresponds to a flying height direction of the magnetic head slider 4A.

The magnetic head slider 4A is structured such that an air bearing surface (ABS) is formed in a flying surface 40 which is opposed to the magnetic disc 2, and flies above the rotating magnetic disc 2 on the basis of an air wedge film effect. The flying surface 40 is constructed by plural kinds of surfaces which are substantially in parallel to each other and are different in depth from each other. A shape of the flying surface 40 can be formed, for example, an ion milling technique, an etching technique or the like.

Specifically, the flying surface 40 mainly includes a step bearing surface 40b which comes closest to the magnetic disc 2, a shallow groove surface 40e which is slightly deeper than the step bearing surface 40b, and a deep groove surface 40h which is equal to or deeper than the shallow groove surface 40e. The shallow groove surface 40e is formed, for example, about 100 nm to about 300 nm deeper than the step bearing surface 40b. Further, the deep grove surface 40h is formed, for example, about 1 μm or more deeper than the step bearing surface 40b.

The air flow generated by the rotation of the magnetic disc 2 is compressed by a tapered flow path at a time of going into the step bearing surface 40b from the shallow groove surface 40e, and generates a positive pressure (a positive pneumatic pressure: a pressure in a direction of staying away from the magnetic disc 2). On the other hand, the air flow generated by the rotation of the magnetic disc 2 generates a negative pressure (a negative pneumatic pressure: a pressure in a direction of coming close to the magnetic disc 2) on the basis of an enlargement of the flow path, at a time of going into the deep groove surface 40h from the step bearing surface 40b.

Further, the flying surface 40 has an element surface 40a in which an end portion of a recording and reproducing element 20 appears, near the trailing edge close to an air outflow side. The element surface 40a is surrounded by the step bearing surface 40b, and is formed in the same surface as the step bearing surface 40b. In this case, the element surface 40a may be formed, for example, in such a manner as to be slightly protruded from the step bearing surface 40b.

Further, in the present embodiment, the flying surface 40 has an intermediate surface 40g having an intermediate depth between the shallow groove surface 40e and the deep groove surface 40h, near an end portion close to the air outflow side. The intermediate surface 40g is positioned in both sides in the slider width direction in the vicinity of the element surface 40a. The intermediate surface 40g is a part of a negative pressure region, however, is shallower than the deep groove surface 40h for enhancing a cooling effect of a heat generating element 21 mentioned below, and is formed, for example, 100 nm or more deeper from the step bearing surface 40b.

In this case, FIG. 2 expresses by emphasizing a depth of each of the surfaces constructing the flying surface 40. Further, the flying surface 40 is not limited to an illustrated shape, but can appropriately employ an optional ABS.

Next, the magnetic head slider 4A has a flat rectangular parallelepiped slider substrate 41 which is comparatively short in its thickness direction, and a thin film lamination portion 42 which is formed in an end surface 41z close to an air outflow side (a trailing side) of the slider substrate 41. The slider substrate 41 is constructed by a sintered body (hereinafter, refer to as an $Al_2O_3Tic$) of an alumina and a titanium carbide. Further, the thin film lamination portion 42 is formed by laminating thin films in accordance with a thin film forming technique. In this case, in FIG. 2, a thickness of the thin film lamination portion 42 is expressed by being emphasized with respect to the slider substrate 41.

The recording and reproducing element 20 and the heat generating element 21 are formed within the thin film lamination portion 42. The recording and reproducing element 20 and the heat generating element 21 are formed in accordance with a thin film forming technique in the process of forming the thin film lamination portion 42. Further, the other portions than the recording and reproducing element 20 and the heat generating element 21 in the thin film lamination portion 42 are made of an alumina ($Al_2O_3$).

The recording and reproducing element 20 is formed in the center portion in the slider width direction within the thin film lamination portion 42. The recording and reproducing element 20 includes a recording element constructed by an inductive coil element generating a magnetic field in correspondence to the electric current flowing in the coil, and a recording and reproducing element constructed by a magnetic resistance effect element in which a resistance value changes in correspondence to the received magnetic field. Further, the recording and reproducing element 20 is electrically connected to an external portion by a wiring (not shown).

In this case, the magnetic head slider 4 is not limited to this type, but may be, for example, of a type of a magnetic head slider carrying out a so-called thermal flying height control (TFC) in which the same heat generating element as the heat generating element 21 is incorporated in the vicinity of the recording and reproducing element 20, and which regulates a flying height by protruding the element surface 40a and the step bearing surface 40b toward the magnetic disc 2 on the basis of a thermal expansion.

The heat generating element 21 is arranged in one side in the slider width direction with respect to the recording and reproducing element 20 so as to be away at a predetermined distance. The heat generating element 21 is a thin film resistor which is formed in accordance with a thin film forming technique, and is made of, for example, a metal such as a permalloy, a nichrome or the like. Further, the heat generating element 21 is electrically connected to the external portion by a wiring (not shown). Accordingly, the heat generating element 21 generates heat on the basis of a current application from the external portion.

On the basis of the heat generation of the heat generating element 21, the member around the heat generating element 21 is heated and thermally expanded. In this case, the member around the heat generating element 21 is made of an alumina corresponding to a main body of the thin film lamination portion 42. Among them, the heat generating element 21 and an interposition portion interposed between the recording and reproducing element 20 can displace the recording and reproducing element 20 by their thermal expansions.

Describing in detail, since the heater (heat generating element 21 and surrounding material) and the interposition portion 25 is heated and expanded in the case that a calorific power of the heat generating element 21 is increased, it is possible to displace the recording and reproducing element 20 in a direction of being away from the heat generating element 21. On the other hand, since the heater and the interposition portion 25 is cooled and contracted in the case that the calorific power of the heat generating element 21 is reduced, it is possible to displace the recording and reproducing element 20 in a direction of being close to the heat generating element 21.

As mentioned above, the heat generating element 21 serves as a heat actuator for displacing the recording and reproducing element 20 in the slider width direction. Further, since the slider width direction corresponds to the width direction of the recording track formed in the magnetic disc 2, it is possible to utilize the displacement of the recording and reproducing element 20 on the basis of the current application to the heat generating element 21 for positioning the recording and reproducing element 20.

Further, since the heat generating element 21 is formed within the thin film lamination portion 42 in accordance with the thin film forming technique, together with the recording and reproducing element 20, it is easy to manufacture the magnetic head slider 4A. Further, since it is possible to enhance a rigidity of a force transmission system from the heat generating element 21 to the recording and reproducing element 20, it is possible to enhance the servo band width of the positioning control.

Next, it is preferable that the heat generating element 21 is formed in the same layer as the layer including at least a part of the recording and reproducing element 20 in the thin film lamination portion 42. The heat generating element 21 has such a shape as to meander within the surface which is in parallel to the end surface 41z close to the air outflow side of the slider substrate 41, and is formed in at least one layer constructing the thin film lamination portion 42. On the other hand, the recording and reproducing element 20 is formed over a plurality of layers which are more than this. Accordingly, it is possible to efficiently transmit the thermal expansion of the heater portion (area) and the interposition portion 25 interposed between the recording and reproducing element 20 and the heat generating element 21 to the recording and reproducing element 20 in the slider width direction, by forming the heat generating element 21 in the layer including at least a part of the recording and reproducing element 20.

In this case, the structure is not limited to this, but the recording and reproducing element 20 and the heat generating element 21 may be formed in the different layers. Since the member around the heat generating element 21 is expanded radially around the heat generating element 21, it is possible to sufficiently transmit the expansion of the interposition portion 25 interposed between the recording and reproducing element 20 and the heat generating element 21 to the recording and reproducing element 20 in the slider width direction, even if the recording and reproducing element 20 and the heat generating element 21 are formed in the different layers.

Further, as shown in FIG. 4, it is preferable that the heat generating element 21 has a flat shape extending in the slider width direction. In other words, the heat generating element 21 has such a shape as to elongate in the slider width direction while meandering, and a length L in the elongating direction is longer than a meandering width Ls. Since it is possible to superpose the expansion in the slider width direction of the member around the heat generating element 21 under the same temperature rise by elongating the heat generating element 21 in the slider width direction as mentioned above, it is possible to enhance an amount of displacement in the slider width direction of the recording and reproducing element 20. Further, in the case of elongating the heat generating element 21 in the slider width direction, it is possible to relax a concentration of the heat in the case of increasing an input electric power, whereby it is possible to suppress a deterioration of a recording and reproducing characteristic caused by a temperature rise in the vicinity of the heat generating element 21. Further, since it is possible to suppress the deformation of the step bearing surface 40*b* and the intermediate surface 40*g* in the vicinity of the heat generating element 21, it is possible to suppress an influence with respect to the flying characteristic of the magnetic head slider 4A.

In this case, it is preferable that the length L along the slider width direction of the heat generating element 21 is, for example, equal to or more than 20 μm and equal to or less than 100 μm. If the length L is equal to or more than 20 μm, it is possible to sufficiently enhance the amount of displacement in the slider width direction of the recording and reproducing element 20. On the other hand, even if the length L becomes too large, the effect of displacing the recording and reproducing element 20 in the slider width direction is saturated, and the expansion of the portion which is in the opposite side to the recording and reproducing element 20 is only increased. Accordingly, it is preferable to be equal to or less than 100 μm.

Further, as shown in FIG. 3, it is preferable that a projection position at a time of projecting the heat generating element 21 with respect to the flying surface 40 in a thickness direction is included in the surface which is equal to or deeper than the shallow groove surface 40*e*. In the present embodiment, the projection position is included into the intermediate surface 40*g* which is formed deeper from the step bearing surface 40*b*, for example, at 150 nm or more. Since the deeper surface than the shallow groove surface 40*e* as mentioned above does not affect the positive pressure generated in the flying or air-bearing surface 40, even if it is deformed on the basis of the heat generation of the heat generating element 21, it does not affect the flying characteristics of the magnetic head slider 4A.

Further, it is preferable that the projection position of the heat generating element 21 is included in the surface which is shallower than the deep groove surface 40*h*. In the present embodiment, the projection position of the heat generating element 21 is included in the intermediate surface 40*g* which has an intermediate depth between the shallow groove surface 40*e* and the deep groove surface 40*h*. In order to displace the recording and reproducing element 20 which is deformed on the basis of the thermal expansion of the heater 21 and the interposition portion 25, in a reverse direction thereto, it is necessary that the heat generating element 21 is cooled, however, since the projection position is in the intermediate surface 40*g* which is shallower than the deep groove surface 40*h* and more tends to be exposed to the air flow, it is possible to more enhance the cooling effect of the heat generating element 21.

In this case, the flying or air-bearing surface 40 may be formed as the deep groove portion 40*h* without forming the intermediate surface 40*g*. In this case, the projection position of the heat generating element 21 is included in the deep groove surface 40*h*. Even in the case that the projection position is in the deep groove surface 40*h* as mentioned above, it is possible to sufficiently cool the heat generating element 21.

Further, as shown in FIG. 4, it is preferable that a distance $L_Y$ between the recording and reproducing element 20 and the heat generating element 21 along the slider width direction is, for example, equal to or more than 10 μm and equal to or less than 100 μm. The smaller the distance $L_Y$ is made, the more a time response of the displacement of the recording and reproducing element 20 can be enhanced. However, since an edge of the step bearing surface 40*b* is away from the recording and reproducing element 20 at about 10 μm or more, it is necessary that the distance $L_Y$ is equal to or more than 10 μm. On the other hand, the greater the distance $L_Y$ is made, the more the amount of displacement of the recording and reproducing element 20 can be enhanced, however, since the effect is saturated even if the distance $L_Y$ becomes too large, it is preferable that the distance is equal to or less than 100 μm. Further, in the light of prevention of the deformation of the step bearing surface 40*b* due to the heat generation of the heat generating element 21, it is further preferable that the distance $L_Y$ is equal to or more than 20 μm.

Further, it is preferable that a distance $L_Z$ from the flying surface 40 to the heat generating element 21 is, for example, equal to or more than 10 μm and equal to or less than 100 μm. In this case, the distance $L_Z$ is a distance in the thickness direction between the intermediate surface 40*g* which is closest to the heat generating element 21 in the flying or air-bearing surface 40, and the heat generating element 21. The smaller the distance $L_Z$ is made, the more the cooling effect of the heat generating element 21 can be enhanced. On the other hand, the greater the distance $L_Z$ is made, the smaller the deformation generated in the intermediate surface 40*g* is made. Accordingly, in the light of compromising them, it is preferable that the distance $L_Z$ is equal to or more than 10 μm and equal to or less than 100 μm.

Figure 5:
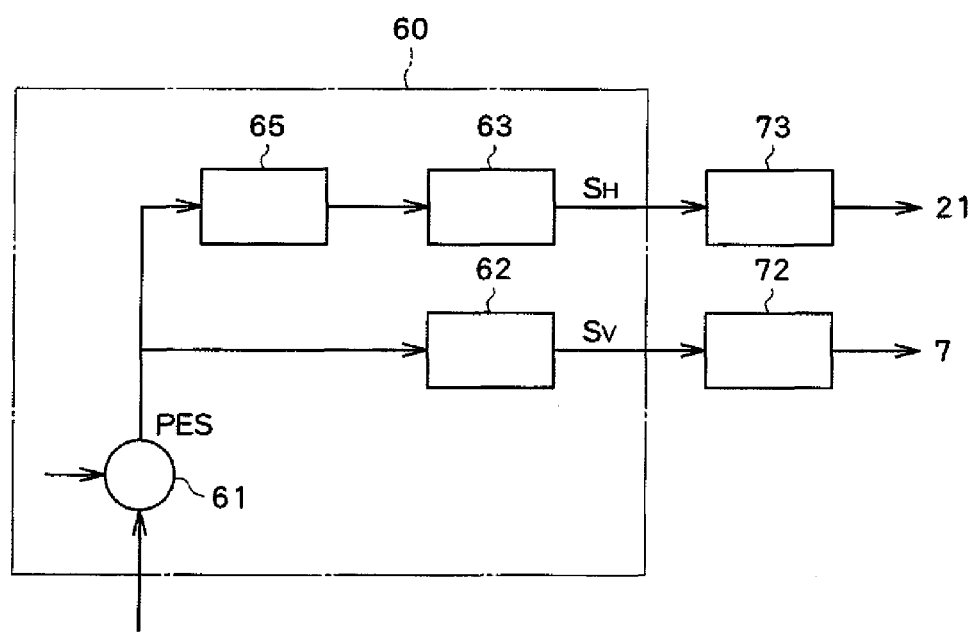
FIG. 5 is a block diagram showing an example of a function structure of the magnetic disc drive in accordance with one embodiment of the present invention.

Next, a description will be given of a positioning control of the recording and reproducing element 20 using the magnetic head slider 4A. FIG. 5 shows an example of a function structure of the magnetic disc drive 1 in accordance with one embodiment of the present invention. The magnetic disc drive 1 has a micro processing unit (MPU) 60 in a circuit board outside the disc enclosure 10. The MPU 60 functionally includes a calculation circuit 61, a coarse motion control and track following control circuit 62 and a fine tracking motion control circuit 63, and makes the recording and reproducing element 20 follow to the recording track formed in the magnetic disc 2 by driving each of the voice coil motor 7 and the heat generating element 21.

The calculation circuit 61 calculates a position error signal (PES) expressing a position error of the recording and reproducing element 20 with respect to a target recording track by determining a difference between the target track of the recording and reproducing element 20 which is decided by a recording command or a reproducing command from an external host, and a current position of the recording and reproducing element 20 which is specified on the basis of the servo data read by the recording and reproducing element 20.

The coarse motion control and track following control circuit 62 generates a control command $S_V$ of the voice coil motor 7 so as to suppress the position error of the recording and reproducing element 20 on the basis of the position error signal PES input from the calculation circuit 61, and outputs it to the voice coil motor 7 via a motor driver 72.

The fine tracking motion control circuit 63 generates a control command $S_H$ of the heat generating element 21 so as to suppress the position error of the recording and reproducing element 20 on the basis of the position error signal PES input from the calculation circuit 61, and outputs it to the heat generating element 21 via a heater driver 73. In this case, the control command $S_H$ output from the fine tracking motion control circuit 63 corresponds to an electric power to be fed to the heat generating element 21.

Describing in detail, the heater driver 73 circulates the electric current of a reference electric power corresponding to the half of the maximum allowable head displacement, in the heat generating element 21, and displaces the recording and reproducing element 20 at a mean position. Further, the fine tracking motion control circuit 63 makes the heater driver 73 increase and decrease the electric power of the heat generating element 21 from the reference electric power, by outputting the control command $S_H$ corresponding to the position error of the recording and reproducing element 20. Accordingly, since the heater 21 and the interposition portion 25 expands and contracts, it is possible to displace the recording and reproducing element 20 in either way in the slider width direction.

In other words, in the case of displacing the recording and reproducing element 20 in the direction of staying away from the heat generating element 21, the electric power of the heat generating element 21 is increased from the reference electric power. On the other hand, in the case of displacing the recording and reproducing element 20 in the direction of coming close to the heat generating element 21, the electric power of the heat generating element 21 is decreased from the reference electric power.

In this case, since the displacement of the recording and reproducing element 20 is in proportion to the electric power of the heat generating element 21, it is possible to control the amount of displacement of the recording and reproducing element 20 by controlling the square value of the electric current amount of the heat generating element 21.

Since the control method of outputting the electric power which is in proportion to the control command as mentioned above is a known technique which has been already used in the TFC for controlling the flying height by a thermal actuator, it can be easily applied to the present embodiment.

As mentioned above, since it is possible to finely displace the recording and reproducing element 20 in the width direction of the recording track formed in the magnetic disc 2, by controlling the current application to the heat generating element 21 provided in one side in the slider width direction with respect to the recording and reproducing element 20, it is possible to position the recording and reproducing element 20 at a high precision.

Further, the MPU 60 further includes a compensator 65 compensating a time lag of the displacement of the recording and reproducing element 20 with respect to the current applied to the heat generating element 21. In the present embodiment, since the recording and reproducing element 20 is displaced by the expansion of the heater portion 20 and the interposition portion 25 on the basis of the heat generation of the heat generating element 21, the time lag is generated due to a propagation of the heat, and the control object is modeled as a so-called first order lag system. Accordingly, as is well known, it is possible to compensate the time lag of the displacement of the recording and reproducing element 20 and it is possible to enhance the time response by using a lead filter having an inverse characteristic to the first order lag system of the heater mentioned above.

In this case, the function structure of the MPU 60 is not limited to this type. In the present embodiment, the control of the voice coil motor 7 and the control or the heat generating element 21 are independent, however, the structure is not limited to this, but may be made such as to input the control command $S_H$ output from the fine tracking motion control circuit 63 to the coarse motion control and track following control circuit 62 together with the position error signal PES via a model of the heat generating element 21, thereby making the control of the voice coil motor 7 and the control of the heat generating element 21 incoherent.

Further, in the present embodiment, the description is given of the magnetic disc drive of the two-stage actuator in which the voice coil motor 7 is set to the first stage, and the heat generating element 21 serving as the thermal actuator is set to the second stage, however, the structure is not limited to this, but may be made such as to come to a magnetic disc drive of a three-stage actuator by further including a micro actuator constructed by a piezo element or the like. In other words, the voice coil motor 7 is set to the first stage, the micro actuator regulating the position of the magnetic head slider 4A with respect to the head suspension 6 is set to the second stage, and the heat generating element 2 serving as the thermal actuator is set to the third stage.

Figure 15:
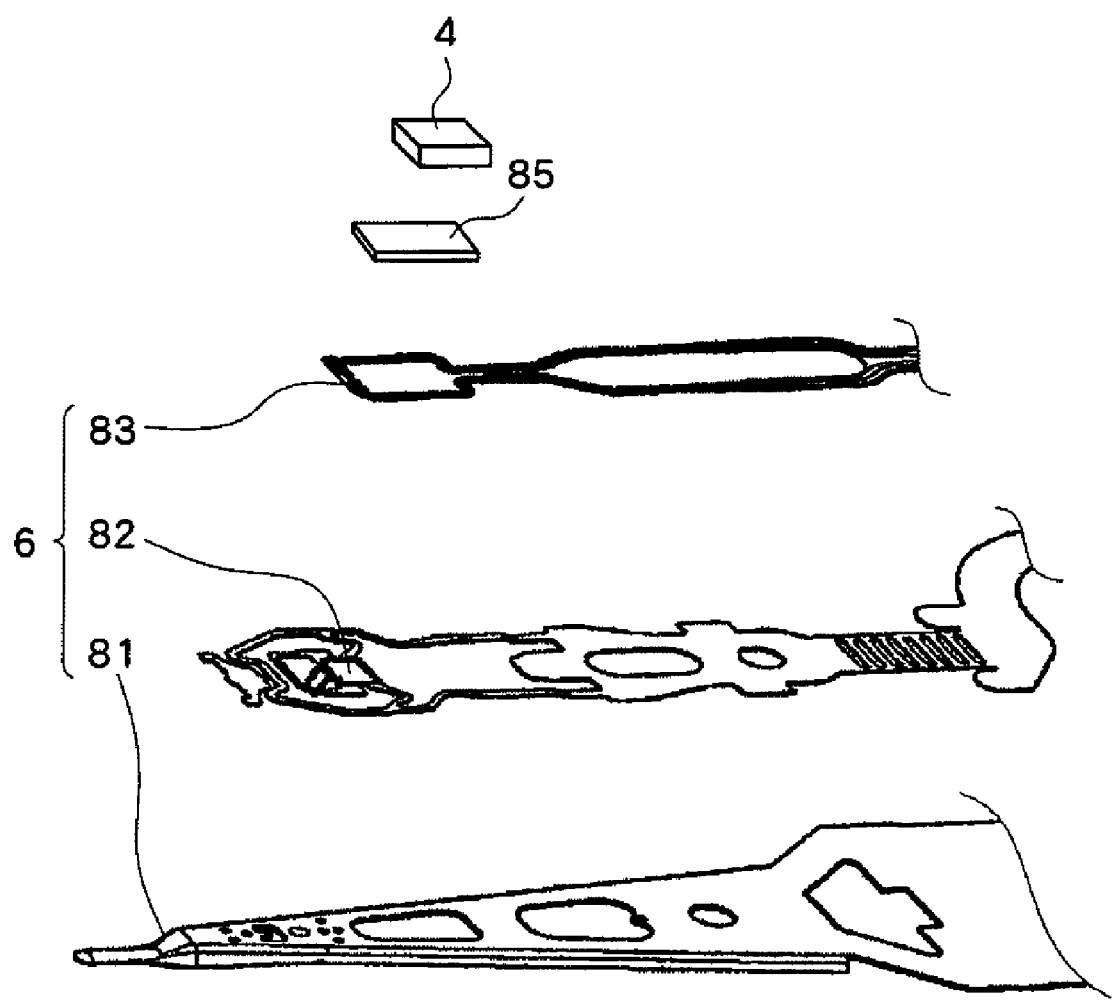
FIG. 15 is a perspective view showing a structure of a head suspension of a magnetic disc drive in accordance with a modified embodiment of the present invention.

A structure of the leading end portion of the head suspension 6 in this case is shown in an exploded perspective view in FIG. 15. The leading end portion of the head suspension 6 has a suspension arm 81, a flexure 82 and an FPC 83. The magnetic head slider 4 is mounted to the suspension arm 81 via a micro actuator 85 constructed by a piezo element or the like. The micro actuator 85 relatively moves the magnetic head slider 4 in a corresponding direction to the width direction of the track with respect to the suspension arm 81 (a so-called slider drive type). In this case, the structure is not limited to this type, but may be set to a so-called suspension drive type in which the micro actuator is mounted between the suspension arm 81 and carriage arm that is not shown here.

Figure 16:
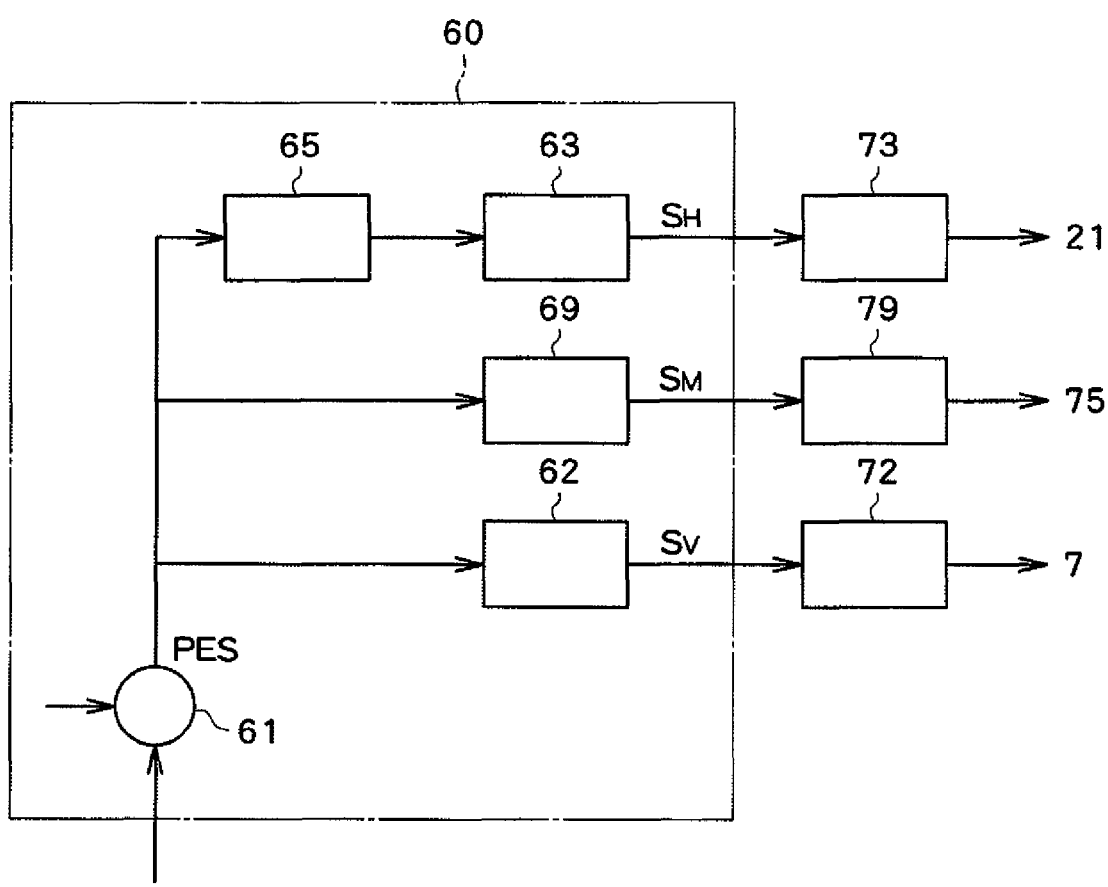
FIG. 16 is a block diagram showing an example of a function structure of a magnetic disc drive in accordance with a modified embodiment of the present invention.

Further, an example of a function structure of the MPU 60 in this case is shown in FIG. 16. The MPU 60 further includes an intermediate fine tracking motion control circuit 69 in addition to the structure shown in FIG. 5 mentioned above. The intermediate fine tracking motion control circuit 69 generates a control command $S_M$ of a micro actuator 75 in such a manner as to suppress the position error of the recording and reproducing element 20 on the basis of the position error signal PES input from the calculation circuit 61, and outputs it to the micro actuator 75 via a driver 79, in the same manner as the coarse motion control and track following control circuit 62 and the fine tracking motion control circuit 63. Accordingly, it is possible to position the recording and reproducing element 20 to the recording track of the magnetic disc 2 at a higher precision.

[Second Embodiment of Magnetic Head Slider]

Figure 6:
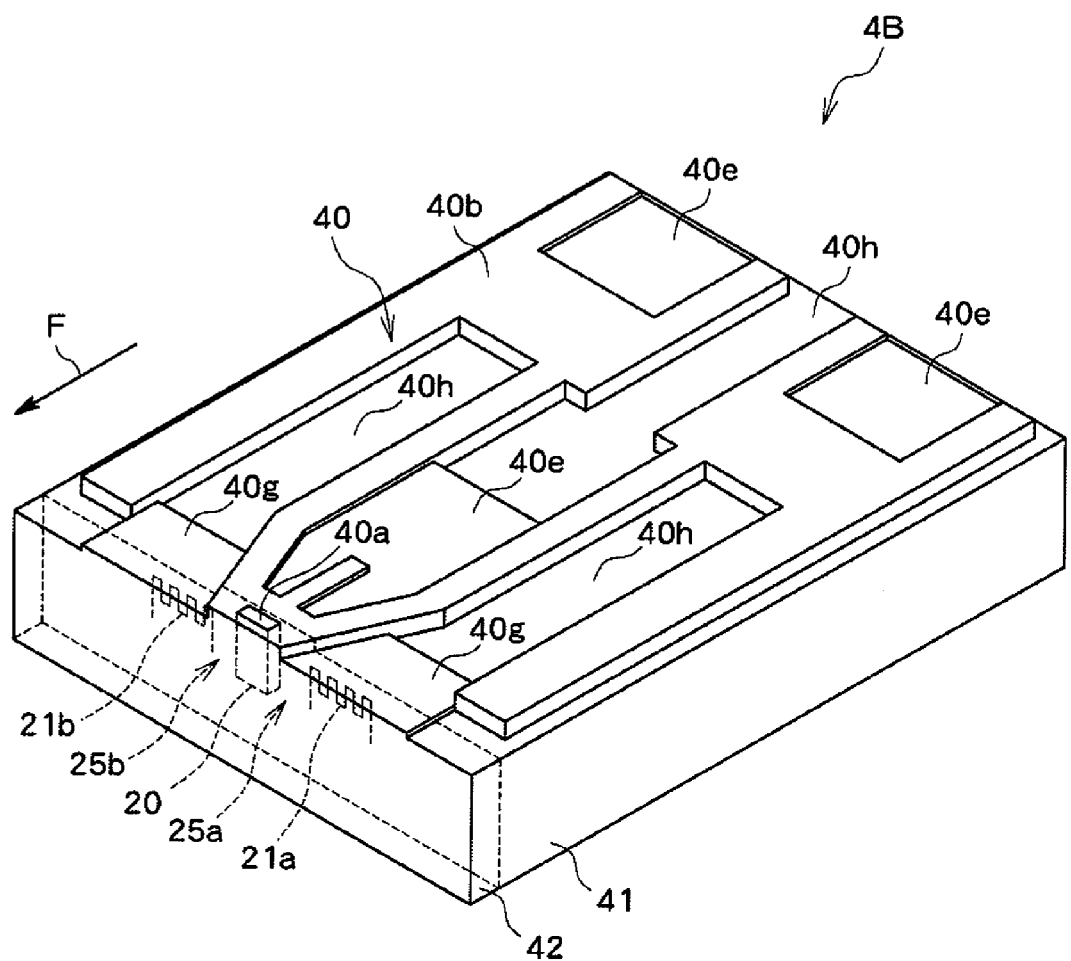
FIG. 6 is a perspective view of the magnetic head slider in accordance with one embodiment of the present invention.
Figure 7:
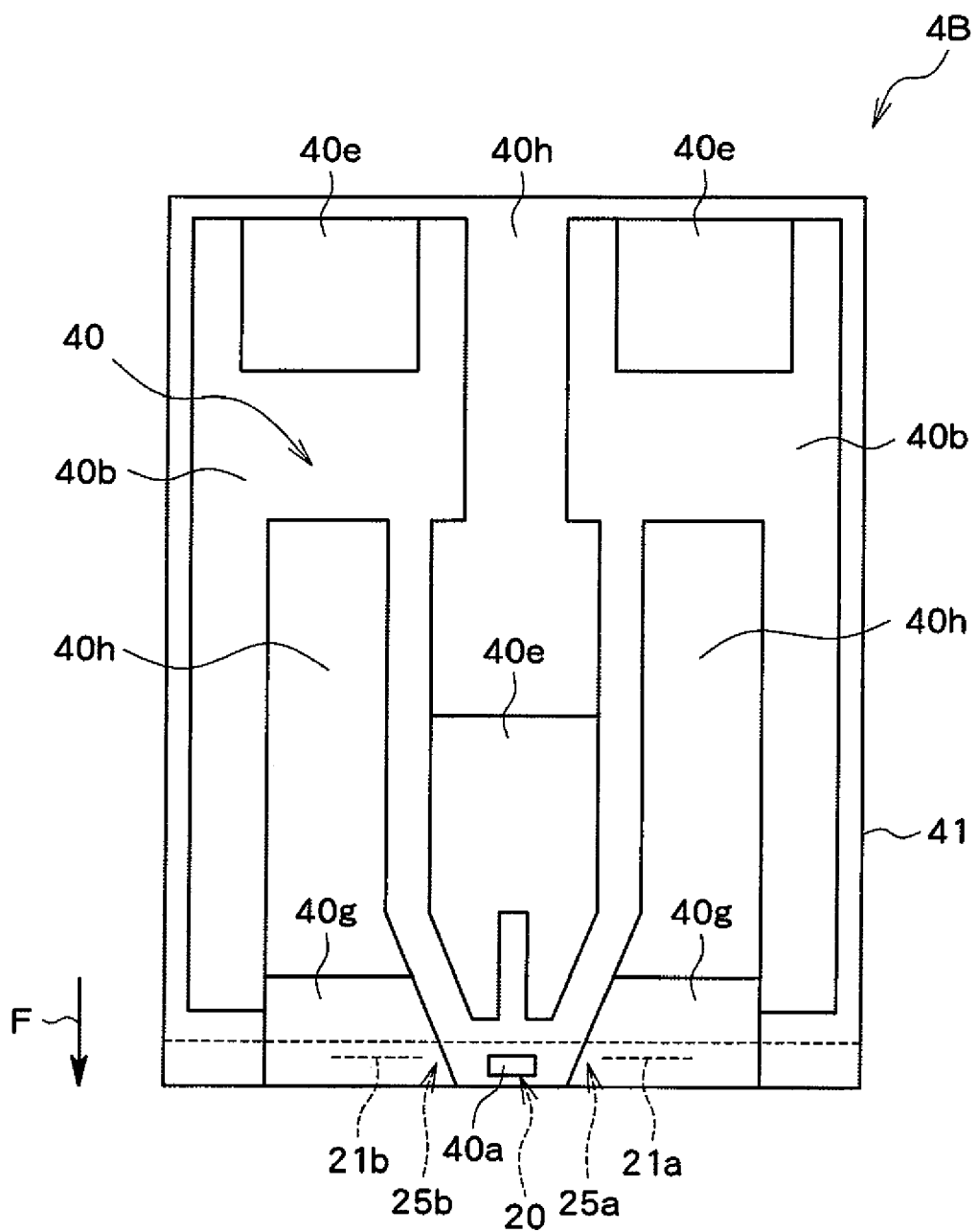
FIG. 7 is a plan view of the magnetic head slider in accordance with one embodiment of the present invention.

FIGS. 6 and 7 show a perspective view and a plan view of a second embodiment (hereinafter, refer to as a magnetic head slider 4B) of the magnetic head slider 4. In this case, with regard to the redundant structures of the first embodiment mentioned above, a detailed description will be omitted by attaching the same reference numerals to the drawings.

Two heat generating elements 21a and 21b are arranged within a thin film lamination portion 42 of the magnetic head slider 4B so as to be away at a predetermined distance toward each of both sides in a slider width direction with respect to the recording and reproducing element 20. These heat generating elements 21a and 21b are arranged at approximately symmetrical positions in the slider width direction around the recording and reproducing element 20. In this case, the positions and the magnitudes of the heat generating elements 21a and 21b are the same as those of the heat generating element 21 in the first embodiment mentioned above.

Further, as shown in FIG. 7, each of projection positions at a time of projecting the heat generating elements 21a and 21b in the thickness direction with respect to the flying surface 40 is included in the intermediate surface 40g which is equal to or deeper than the shallow groove surface 40e. The intermediate surface 40g is the surface which is formed, for example, 150 nm or deeper from the step bearing surface 40b, as mentioned above, and is the surface which is equal to or deeper than the shallow groove surface 40e and shallower than the deep groove surface 40h.

In this case, the portion of the heater 21a and an interposition portion 25a interposed between the recording and reproducing element 20 and the heat generating element 21a, and the portion of the heater 21b and an interposition portion 25b interposed between the recording and reproducing element 20 and the heat generating element 21b can displace the recording and reproducing element 20 by thermally expanding respectively.

Describing in detail, in the case of heat generating the heat generating element 21a, since the material surrounding the heater 21a and the interposition portion 25a expand, it is possible to displace the recording and reproducing element 20 in a direction of staying away from the heat generating element 21a. On the other hand, in the case of heat generating the heat generating element 21b, since the material surrounding the heater 21b and the interposition portion 25b expand, it is possible to displace the recording and reproducing element 20 in a direction of staying away from the heat generating element 21b.

Figure 8:
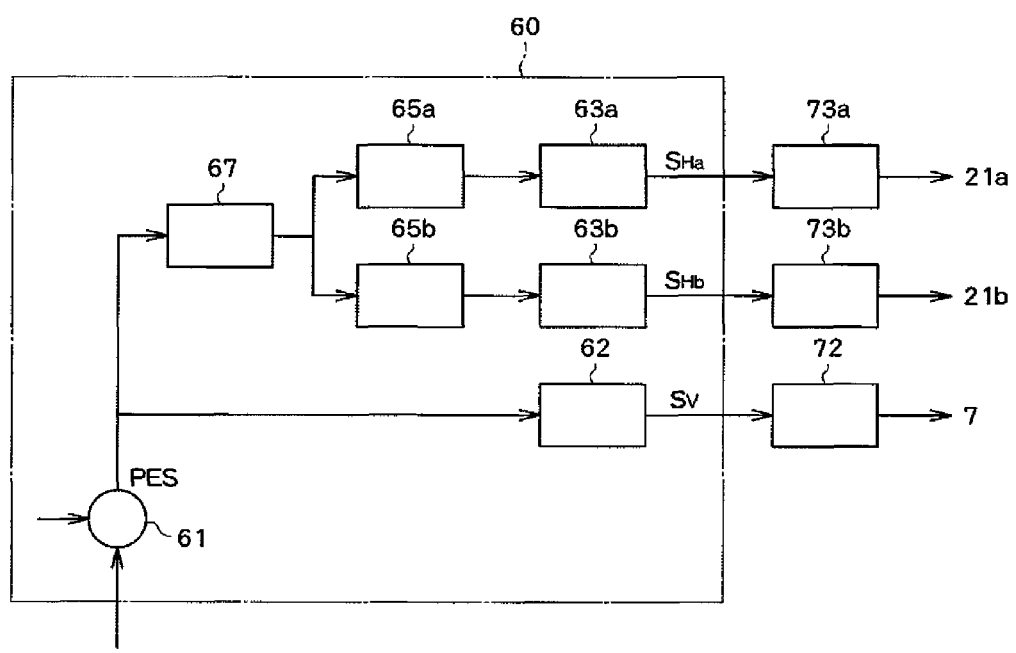
FIG. 8 is a block diagram showing an example of a function structure of the magnetic disc drive in accordance with one embodiment of the present invention.

Next, a description will be given of a positioning control of the recording and reproducing element 20 by using the magnetic head slider 4B mentioned above. FIG. 8 shows an example of a function structure of the magnetic disc drive 1 in accordance with one embodiment of the present invention. An MPU 60 functionally includes a calculation circuit 61, a coarse motion control and track following control circuit 62, a first fine tracking motion control circuit 63a, a second fine tracking motion control circuit 63b and a switch 67.

The switch 67 switches an end to which the position error signal PES is output, between the first fine tracking motion control circuit 63a and the second fine tracking motion control circuit 63b, in correspondence to a code of the position error signal PES input from the calculation circuit 61.

The first fine tracking motion control circuit 63a generates a control signal $S_{Ha}$ of the heat generating element 21a so as to suppress the position error of the recording and reproducing element 20, in correspondence to a magnitude of an absolute value of the position error signal PES input from the switch 67, and outputs it to the heat generating element 21a via a first heater driver 73a.

The second fine tracking motion control circuit 63b generates a control signal $S_{Hb}$ of the heat generating element 21b so as to suppress the position error of the recording and reproducing element 20, in correspondence to the magnitude of the absolute value of the position error signal PES input from the switch 67, and outputs it to the heat generating element 21b via a second heater driver 73b, in the same manner.

Specifically, in the case that a position of the recording and reproducing element 20 is deviated to a side of the heat generating element 21a with respect to the recording track of the magnetic disc 2, the switch 67 outputs the position error signal PES to the first fine tracking motion control circuit 63a, and the first fine tracking motion control circuit 63a excites the heat generating element 21a so as to expand the heater portion 21a and the interposition portion 25a, thereby displacing the recording and reproducing element 20 in a direction of staying away from the heat generating element 21a. At this time, the current application to the heat generating element 21b is shut off. On the other hand, in the case that the position of the recording and reproducing element 20 is deviated to a side of the heat generating element 21b with respect to the recording track of the magnetic disc 2, the switch 67 outputs the position error signal PES to the second fine tracking motion control circuit 63b, and the second fine tracking motion control circuit 63b excites the heat generating element 21b so as to expand the heater portion 21b and the interposition portion 25b, thereby displacing the recording and reproducing element 20 in a direction of staying away from the heat generating element 21b. At this time, the current application to the heat generating element 21a is shut off.

In this case, since the displacement of the recording and reproducing element 20 is in proportion to the electric power (that is, the calorific power) of the heat generating element 21, and the electric power of the heat generating element 21 is in proportion to square of the electric current amount of the heat generating element 21, each of the fine tracking motion control circuits 63a and 63b can control the amount of displacement of the recording and reproducing element 20 by making the electric power or the square value of the electric current amount of each of the heat generating elements 21a and 21b in proportion to the magnitude of the absolute value of the position error of the recording and reproducing element 20.

As mentioned above, since it is possible to finely displace the recording and reproducing element 20 in the width direction of the recording track formed in the magnetic disc 2 by selectively controlling the current application to the heat generating elements 21a and 21b provided in both sides in the slider width direction with respect to the recording and reproducing element 20, it is possible to position the recording and reproducing element 20 at a high precision thereby.

Further, in the case of selectively controlling the current application to the heat generating elements 21a and 21b as mentioned above, it is possible to make the amount of displacement of the recording and reproducing element 20 twice larger in comparison with the case of the first embodiment mentioned above. Further, in the case of selectively controlling the current application to the heat generating elements 21a and 21b, since it is possible to excite the other without waiting one being cooled, at a time of switching the direction of displacing the recording and reproducing element 20, it is possible to more enhance the time response of the displacement of the recording and reproducing element 20.

In this case, the structure is not limited to this, but may be made such that the current application to the heat generating elements 21a and 21b is achieved by circulating the electric current of the reference electric power in the heat generating elements 21a and 21b and increasing and decreasing the electric power of the heat generating elements 21a and 21b from the reference electric power in correspondence to the position error of the recording and reproducing element 20, in the same manner as the first embodiment mentioned above. In other words, the recording and reproducing element 20 is displaced in the slider width direction by generating a difference between the electric power of the heat generating element 21a and the electric power of the heat generating element 21h.

Further, the MPU 60 can further include compensators 65a and 65b compensating the time lag of the displacement of the recording and reproducing element 20 with respect to the current applied to each of the heat generating elements 21a and 21b, in the same manner as the first embodiment mentioned above.

A description will be given below of a comparison between the magnetic head sliders 4A and 4B in accordance with the present embodiments, and the technique for incorporating the piezo element in the magnetic head slider, which is disclosed in the patent document 1 mentioned above.

In the case of pinching the tabular piezo element between the slider substrate and the element substrate including the recording and reproducing element, a method of bonding them to each other is employed, however, it is not easy to manufacture the magnetic head slider, in this method. Further, since a polarization of the piezo element collapses at a temperature about 150° C., it is impossible to rise the process temperature higher than this, and it is not easy to manufacture.

Further, since a material of the piezo element is different from the slider substrate and the element substrate, it is hard to secure a working precision of the flying surface, such as a micro step being generated at a time of working the flying surface. Further, since the piezo element is made of a polycrystal material, there is such a problem that a dust tends to be generated. Particularly, in the case of incorporating the piezo element in the magnetic head slider, a membrane for preventing the dust from being generated can not be provided.

Further, there can be considered a method of forming the piezo element as a thin film in an end surface of the slider substrate, however, this method has such a problem that the piezo element can not be deflected enough to displace the recording and reproducing element.

On the contrary, in the magnetic head sliders 4A and 4B in accordance with the present embodiment, since the heat generating element 21 is formed within the thin film lamination portion 42 in accordance with the thin film forming technique in the same manner as the recording and reproducing element 20, it is easy to manufacture. Further, since the heat generating element 21 is formed within the thin film lamination portion 42, neither the problem of working the flying surface 40 is generated, nor the problem of generating the dust is generated. In other words, the magnetic head sliders 4A and 4B in accordance with the present embodiment can be manufactured in the same manner as the normal magnetic head slider which is not provided with the heat generating element 21.

Further, in the magnetic head sliders 4A and 4B in accordance with the present embodiment, it has been confirmed by the inventor of the present invention on the basis of a numerical calculation and an experimental data of the TFC magnetic head slider, that the displacement in the slider width direction of the recording and reproducing element 20 comes to about 10 nm, and that the time response of the recording and reproducing element 20 comes to about 0.1 ms in time constant, in the case that the electric power fed to the heat generating element 21 is set, for example, to 100 mW. It is possible to increase the displacement in the slider width direction of the recording and reproducing element 20 in proportion to the input electric power. Accordingly, for example, if the fed electric power is set to about 200 mW, it is possible to make the displacement of the recording and reproducing element 20 equal to or more than 20 nm. Further, if an inverse lead filter is used, it is possible to make the control band width equal to or more than 3 kHz. These values are enough values to position the recording and reproducing element 20 at a high precision, in the magnetic disc drive having the magnetic disc of a high track density which is equal to or higher than 10 k track/mm.

[Modified Embodiment of Magnetic Head Slider]

FIGS. 9 to 14 show modified embodiments (hereinafter, refer to as magnetic head sliders 4C to 4H) of the magnetic head slider 4A in accordance with the first embodiment mentioned above. In this case, with regard to the redundant structures of the first embodiment mentioned above, a detailed description will be omitted by attaching the same reference numerals to the drawings.

Figure 9:
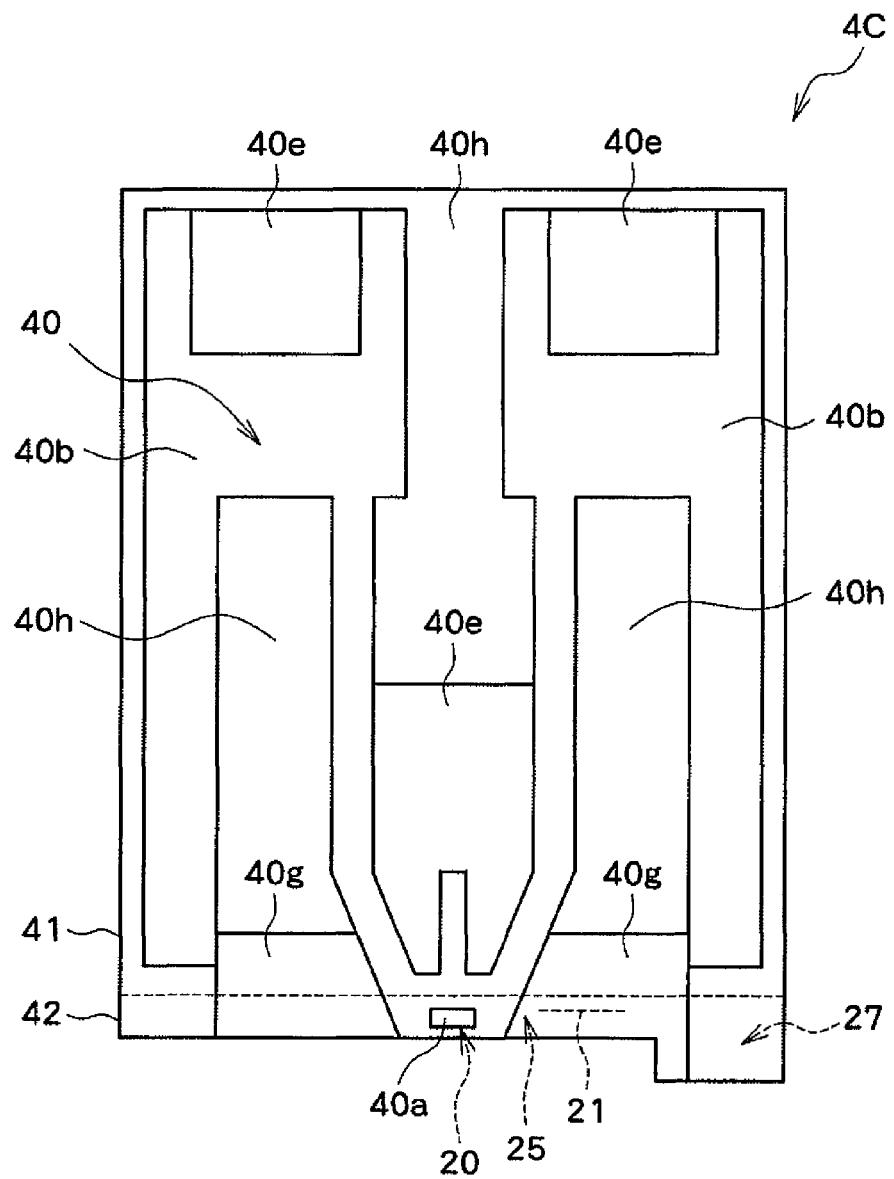
FIG. 9 is a plan view of a magnetic head slider in accordance with a modified embodiment of the present invention.

In the magnetic head slider 4C shown in FIG. 9, the structure is made such that an outer portion 27 positioned in an outer side in the slider width direction than the heat generating element 21 with respect to the recording and reproducing element 20 in the members around the heat generating element 21 is hard to be deformed rather than the heater portion 21 and the interposition portion 25 which is interposed between the recording and reproducing element 20 and the heat generating element 21.

Specifically, the thin film lamination portion 42 is structured such that the outer portion 27 positioned in the outer side in the slider width direction than the heat generating element 21 with respect to the recording and reproducing element 20 is formed thicker than the interposition portion 25 which is interposed between the recording and reproducing element 20 and the heat generating element 21, whereby the outer portion 27 is hard to be deformed than the interposition portion 25. In accordance with this, the expansion of the outer portion 27 is suppressed at a time when the member around the heat generating element 21 expands, and it is possible to enhance an amount of expansion of the interposition portion 25 heading for the recording and reproducing element 20 from the heat generating element 21.

In this case, the structure is not limited to the case that the thickness of the thin film lamination portion 42 is changed, but may be made such that the outer portion 27 is harder to be deformed than the interposition portion 25, by providing a difference in a material characteristic. Specifically, it is desirable to satisfy at least one of conditions 1) a specific heat is great and a temperature rise is small, 2) a coefficient of thermal expansion is small with respect to the same temperature rise, and 3) a Young's modulus is great, in comparison with the material characteristic of the interposition portion 25. In this case, enlarging the Young's modulus is for making it hard to deform with respect to a stress caused by the thermal expansion.

Figure 10:
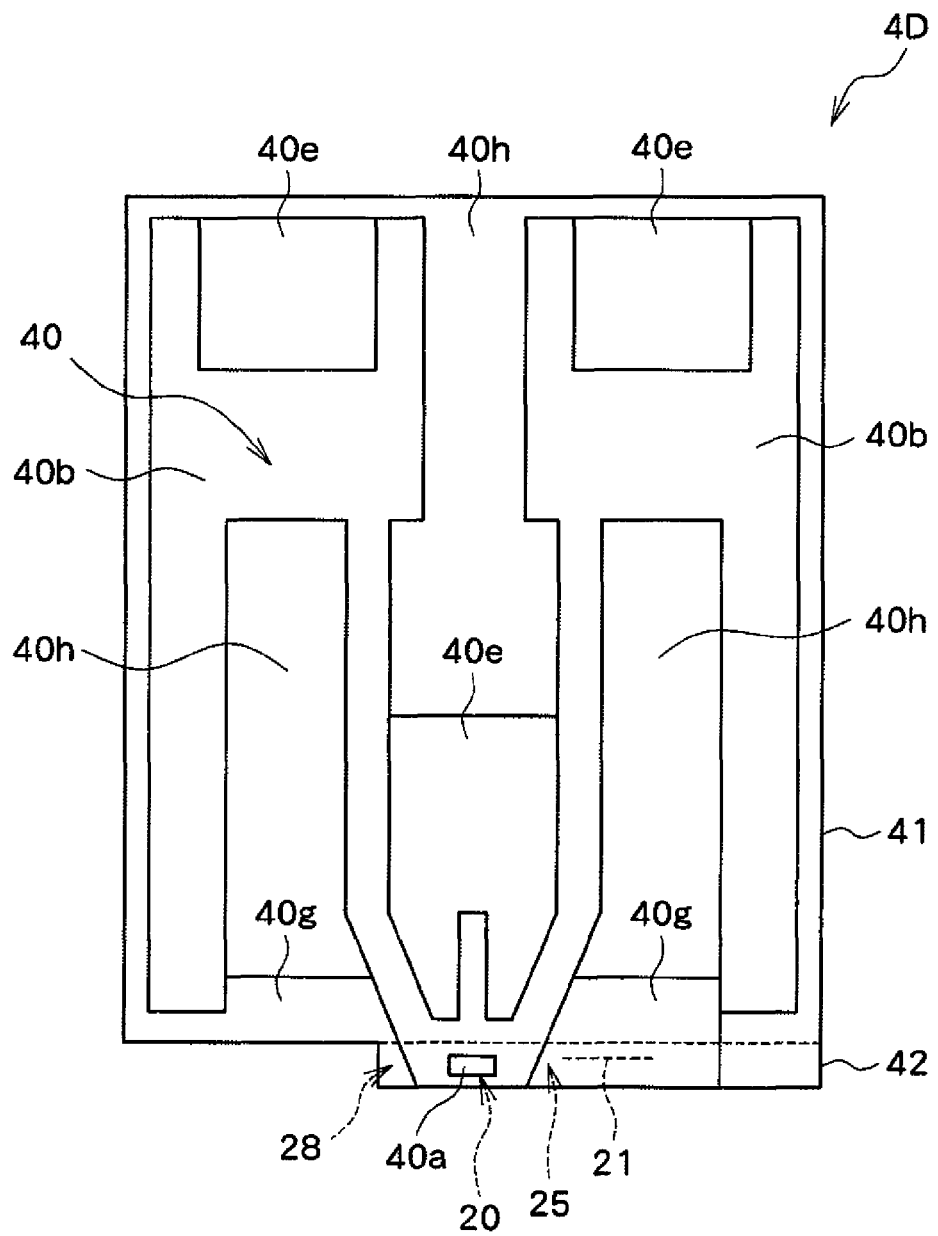
FIG. 10 is a plan view of a magnetic head slider in accordance with a modified embodiment of the present invention.
Figure 11:
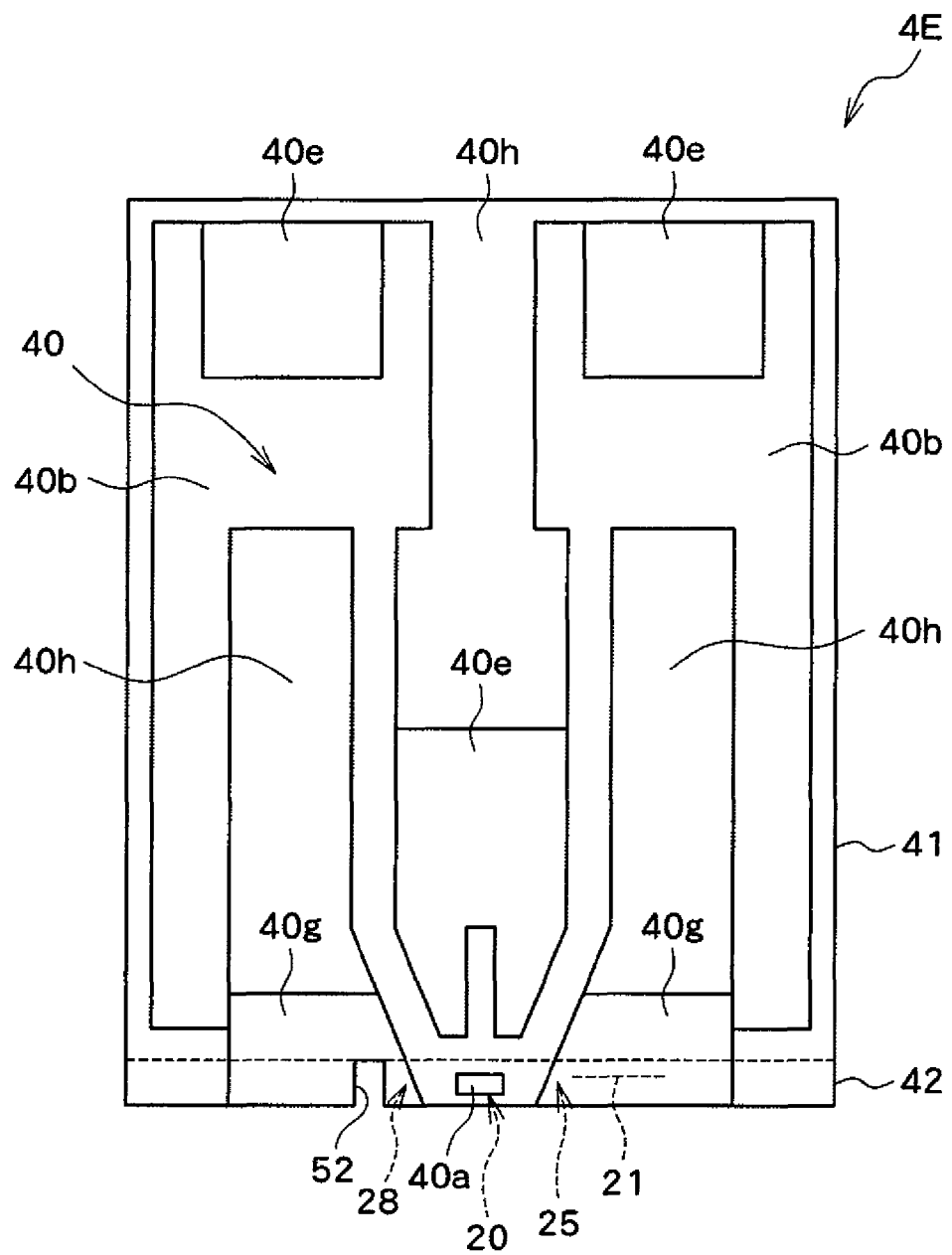
FIG. 11 is a plan view of a magnetic head slider in accordance with a modified embodiment of the present invention.

In the magnetic head sliders 4D and 4E shown in FIGS. 10 and 11, an opposite side portion 28 which is positioned in an opposite side in the slider width direction to the heat generating element 21 with respect to the recording and reproducing element 20 in the members around the recording and reproducing element 20 is structured such as to be more easily deformed than the interposition portion 25 which is interposed between the recording and reproducing element 20 and the heat generating element 21. In accordance with this, it is possible to enhance the amount of expansion of the interposition portion 25 heading for the recording and reproducing element 20 from the heat generating element 21.

Specifically, the thin film lamination portion 42 is structured such that at least a part of the opposite side in the slider width direction to the heat generating element 21 with respect to the recording and reproducing element 20 is lack, whereby the opposite side portion 28 is more easily deformed than the interposition portion 25.

In other words, as shown in FIG. 10, by forming the laminated layer thinner than that of the heater portion 21 and interposition portion 25 or not forming the laminated layer in a region whose distance from the recording and reproducing elements 20 is larger than a specified value, it is possible to make the opposite side portion 28 be more easily deformed than the interposition portion 25. In this case, it can be said that the recording and reproducing element 20 is arranged in the end portion in the slider width direction within the thin film lamination portion 42.

Further, as shown in FIG. 11, by making a notch at a specified distance in the slider width direction from the recording and reproducing element 20, it is possible to make the opposite side portion 28 be more easily deformed than the interposition portion 25. In this case, the notch 52 may be provided in such a manner as to penetrate into the slider substrate 41. Further, the notch 52 may penetrate in the thickness direction of the slider substrate 41, or may be left in a part of a lower end or an upper end.

In this case, it is possible to prevent the step bearing surface 40b and the shallow groove surface 40e from affecting the generated positive pressure, by setting a notched range of the thin film lamination portion 42 in the area of the deeper surface than the shallow groove surface 40e.

In this case, the structure is not limited to the case that a part of the thin film lamination portion 42 is notched as mentioned above, but may be made such that the opposite side portion 28 is more easily deformed than the interposition portion 25 by providing a difference to the material characteristics. Specifically, it is desirable that the Young's modulus of the opposite side portion 28 is small, in comparison with the material characteristic of the interposition portion 25. In this case, making the Young's modulus small is for making it easy to deform with respect to a stress caused by the thermal expansion.

Figure 12:
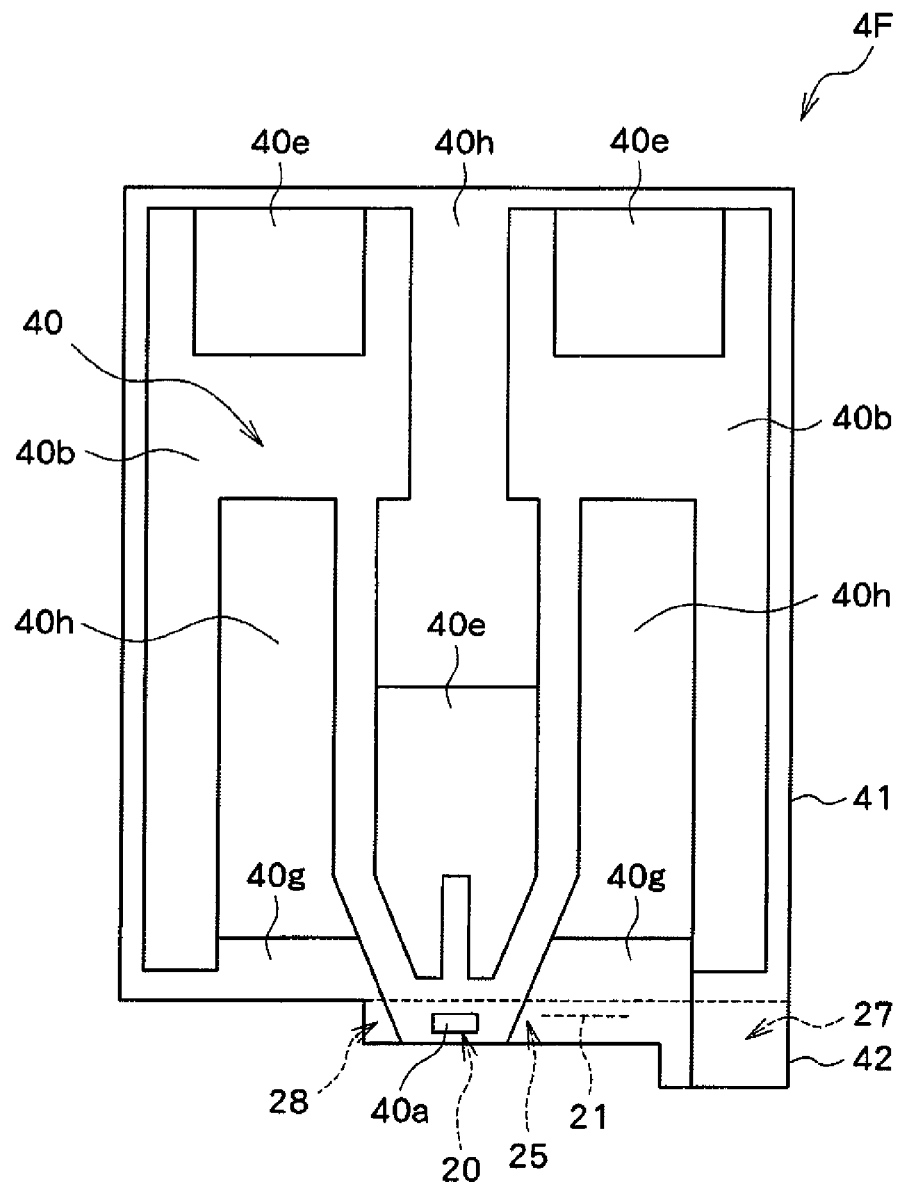
FIG. 12 is a plan view of a magnetic head slider in accordance with a modified embodiment of the present invention.

Further, the structure may be made such that both the outer portion 27 which is harder to be deformed than the interposition portion 25, and the opposite side portion 28 which is more easily deformed than the interposition portion 25 may be provided, such as the magnetic head slider 4F shown in FIG. 12. Accordingly, it is possible to further enhance the amount of expansion of the heater portion 21 and the interposition portion 25 heading for the recording and reproducing element 20 from the heat generating element 21.

Figure 13:
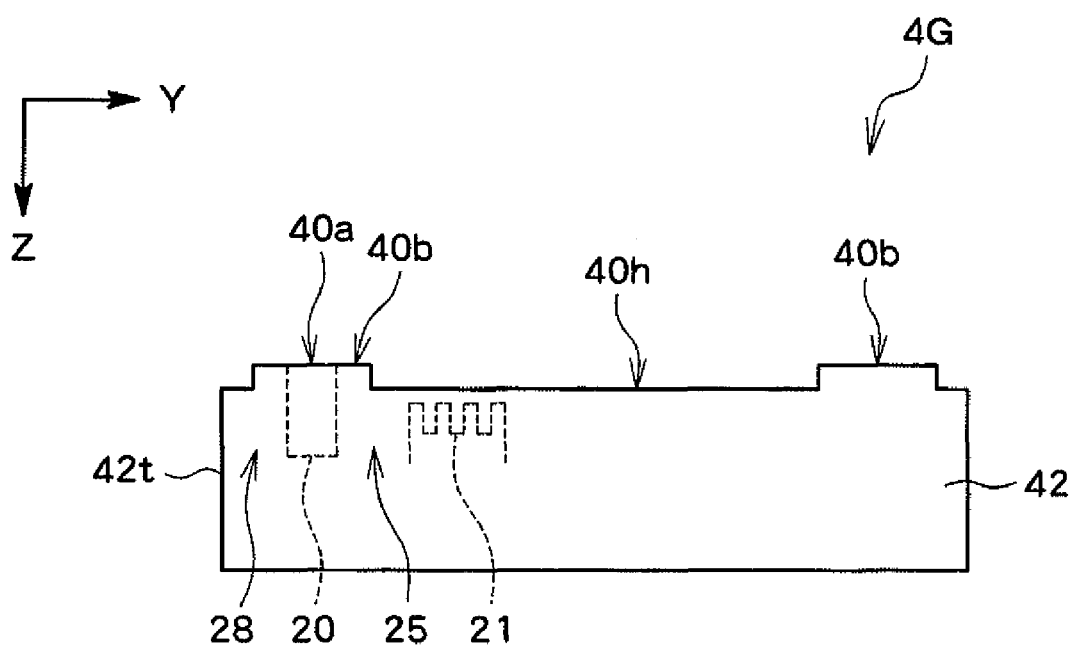
FIG. 13 is a front elevational view of a magnetic head slider in accordance with a modified embodiment of the present invention.

In the magnetic head slider 4G shown in FIG. 13, the recording and reproducing element 20 is arranged in one end portion in the slider width direction within the thin film lamination portion 42. Further, the heat generating element 21 is arranged in an inner side in the slider width direction than the recording ad reproducing element 20 so as to be away at a predetermined distance. In accordance with this, since a distance between the end surface 42t in the slider width direction and the recording and reproducing element 20 is comparatively short, it is possible to make the opposite side portion 28 be more easily deformed than the interposition portion 25 in the same manner as the magnetic head sliders 4D and 4E. As a result, it is possible to enhance the amount of expansion of the heater portion 21 and the interposition portion 25 heading for the recording and reproducing element 20 from the heat generating element 21.

Further, in the embodiment described above, it is desirable that the portion in the vicinity of the heat generating element 21 satisfies at least one of conditions 1) a specific heat is small and a temperature rise is large, 2) a coefficient of thermal expansion is great with respect to the same temperature rise, and 3) a Young's modulus is great, in comparison with the other portions. In this case, enlarging the Young's modulus is for making the portion hard to be compressed by a compression stress.

In this case, the present invention is not limited to the embodiment described above. In the embodiments mentioned above, the heat generating element 21 is provided within the thin film lamination portion 42, however, the structure is not limited to this, but the substrate including the heat generating element 21 may be bonded between the slider substrate 41, and the substrate including the recording and reproducing element 20, or the heat generating element 21 may be provided within the slider substrate 41, as long as the position of the heat generating element 21 is located to satisfy the condition that the recording and reproducing element 20 can be displaced in the slider width direction in correspondence to the heat generation of the heat generating element 21.

Figure 14:
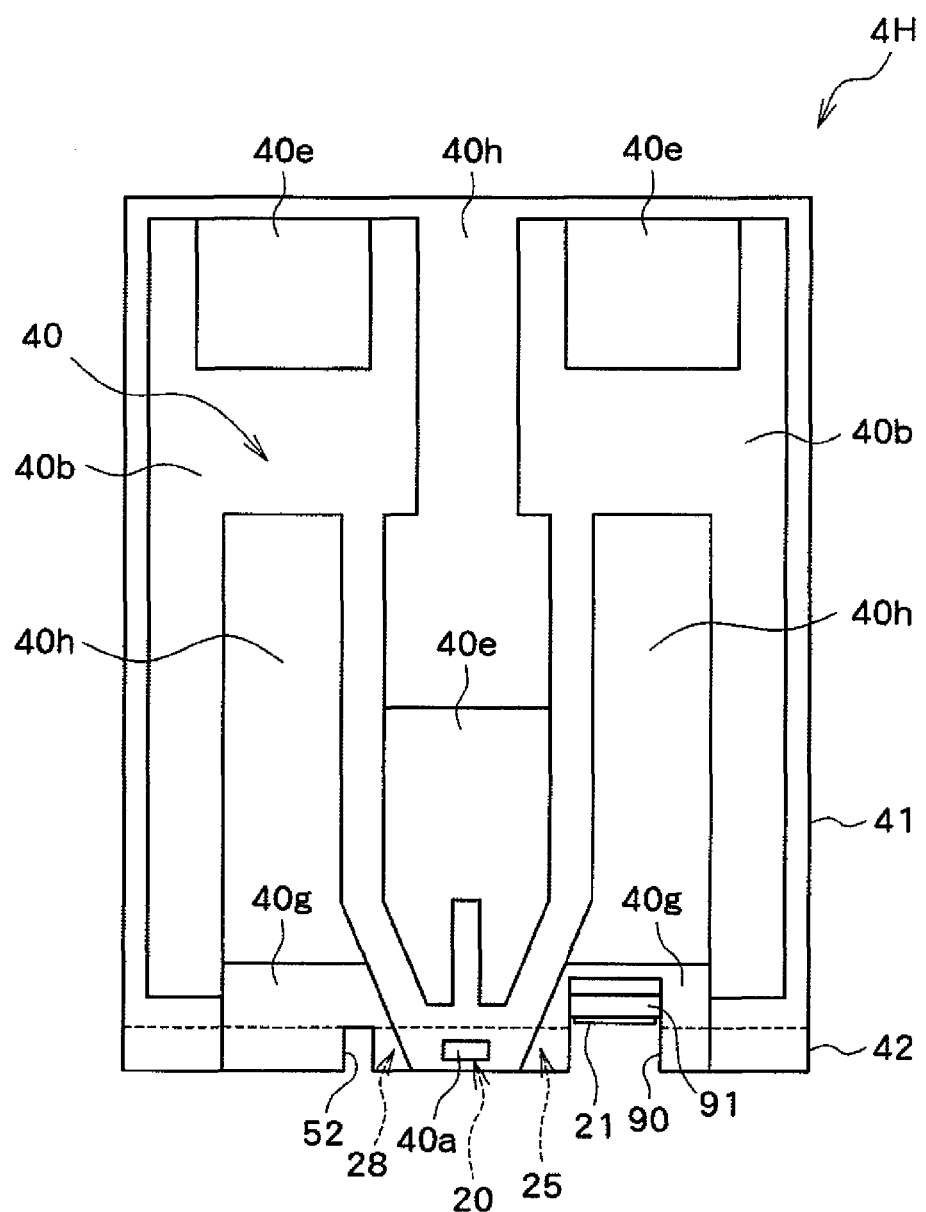
FIG. 14 is a plan view of a magnetic head slider in accordance with a modified embodiment of the present invention.

For example, in a magnetic head slider 4H shown in FIG. 14, a notch 90 is provided in a portion which is provided with the heat generating element 21, in the end portion close to the air outflow side of the slider substrate 41, and a rod-shaped member 91 elongating in the slider width direction is attached within the notch 90. The heat generating element 21 is formed in an outer peripheral surface of the rod-shaped member 91. Further, it is desirable that the notch 52 which is the same as FIG. 11 mentioned above is provided in an opposite side in the slider width direction to the heat generating element 21 with respect to the recording and reproducing element 20.

Since the rod-shaped member 91 is heated and expanded on the basis of the heat generation of the heat generating element 21 formed as mentioned above, this expansion is transmitted as a force in the slider width direction to the slider substrate 41. Accordingly, the interposition portion 25 is pushed in the slider width direction, and it is possible to displace the recording and reproducing element 20. Further, if the rod-shaped member 91 is heated, the heat is transmitted to the interposition portion 25, and the interposition portion 25 itself is expanded. Accordingly, it is possible to displace the recording and reproducing element 20 thereby. In other words, it is possible to displace the recording and reproducing element 20 by superposing the displacement by which the interposition portion 25 is pushed by the rod-shaped member 91, and the expansion of the interposition portion 25 itself.

Further, it is desirable that the material characteristic of the rod-shaped member 91 satisfies at least one of conditions 1) a specific heat is small and a temperature rise is large, 2) a coefficient of thermal expansion is great with respect to the same temperature rise, and 3) a Young's modulus is great, in comparison with the slider substrate 41 and the thin film lamination portion 42. It is possible to further enhance the amount of displacement of the recording and reproducing element 20 with respect to the same input electric power, in comparison with the case of the embodiment mentioned above, by applying the rod-shaped member 91 having the material characteristic mentioned above.

Further, since the notch 52 is provided, it is possible to further enhance the amount of displacement in the slider width direction of the recording and reproducing element 20. Particularly, in the present embodiment, since the notch 90 for attaching the rod-shaped member 91 is formed, it is easy to form the notch 52 together with the notch 90, whereby it is possible to enhance a driving efficiency as the thermal actuator by the heat generating element 21 to the maximum.

In this case, the notch 90 may penetrate in the thickness direction of the slider substrate 41, or a part of a lower end or an upper end thereof may be left. A range in which the notch 90 is formed is set to a range of the deeper surface than the shallow groove surface 40e, such as the intermediate surface 40g, the deep groove surface 40h and the like. The rod-shaped member 91 is attached within the notch 90, for example, in accordance with a pressure inserting method, a bonding method or the like. Further, the heat generating element 21 may be previously formed in an outer peripheral surface of the rod-shaped member 91, or may be formed in an outer peripheral surface of the rod-shaped member 91 in accordance with the same thin film forming technique as the thin film lamination portion 42, after attaching the rod-shaped member 91.

In this case, the structure of the magnetic head slider 411 using the notch 90 and the rod-shaped member 91 as mentioned above can be appropriately combined with the embodiment mentioned above.

It should be further understood by those skilled in the art that the foregoing description has been made on embodiments of the invention and that various changes and modifications may be made in the invention without departing from the sprit of the invention and the scope of the appended claims.

The invention claimed is:

1. A magnetic head slider configured to fly above a rotating magnetic disc, and configured to write and read data, the magnetic head slider comprising:

a recording and reproducing element configured to write and read said data;

a heat generating element arranged in one side in a width direction of said magnetic head slider with respect to said recording and reproducing element, and configured to generate heat on the basis of an application of current; and a member interposed at least between said recording and reproducing element and said heat generating element, and configured to expand in correspondence to the heat generation of said heat generating element, and said recording and reproducing element is configured to move in a width direction of said magnetic head slider on the basis of said expansion, wherein a flying surface opposed to said magnetic disc includes a plurality of surfaces having different depths from each other, and including at least a step bearing surface, a shallow groove surface and a deep groove surface, and a position at a time of projecting said heat generating element to said flying surface is included in a surface which is equal to or deeper than said shallow groove surface and is shallower than said deep groove surface.

2. A magnetic head slider as claimed in claim 1, wherein said heat generating element includes a thin film resistor.

3. A magnetic head slider as claimed in claim 1, wherein the magnetic head slider includes a slider substrate, and a thin film laminated portion formed in an end portion close to an air outflow side of said slider substrate, and wherein said recording and reproducing element and said heat generating element are formed within said thin film laminated portion.

4. A magnetic head slider as claimed in claim 3, wherein said heat generating element is formed in the same layer as the layer including at least a part of said recording and reproducing element in said thin film laminated portion.

5. A magnetic head slider as claimed in claim 1, wherein a flying surface opposed to said magnetic disc includes a plurality of surfaces having different depths from each other, and a position when projecting said heat generating element to said flying surface is included in a surface which is 100 nm or more deeper from a surface which comes closest to said magnetic disc.

6. A magnetic head slider as claimed in claim 1, wherein a distance between said recording and reproducing element and said heat generating element along said width direction is equal to or more than 10 μm and equal to or less than 100 μm.

7. A magnetic head slider as claimed in claim 1, wherein said heat generating element has a flat shape extending in said width direction.

8. A magnetic head slider as claimed in claim 1, wherein a member which is disposed at the outer side of said heat generating element with respect to said recording and reproducing element is configured to be harder to deform than a member which is interposed between said recording and reproducing element and said heat generating element.

9. A magnetic head slider as claimed in claim 1, wherein a member which is disposed in an opposite side to said heat generating element with respect to said recording and reproducing element is configured to be easier to deform than a member which is interposed between said recording and reproducing element and said heat generating element.

10. A magnetic head slider as claimed in claim 1, wherein said recording and reproducing element is arranged in an end portion of said width direction.

11. A magnetic head slider configured to fly above a rotating magnetic disc, and configured to write and read data, comprising:

a recording and reproducing element configured to write and read said data;

a plurality of heat generating elements respectively arranged in both side in a width direction of said magnetic head slider with respect to said recording and reproducing element and configured to generate heat on the basis of an application of current; and a member interposed at least between said recording and reproducing element and each of said heat generating elements, and configured to expand in correspondence to the heat generation of each of said heat generating elements, and said recording and reproducing element is configured to move in a width direction of said magnetic head slider on the basis of said expansion;

wherein a flying surface opposed to said magnetic disc includes a plurality of surfaces having different depths from each other, including at least:
a step bearing surface,
a shallow groove surface, and
a deep groove surface,
and each of a plurality of positions when projecting each of said heat generating element to said flying surface is included in a surface which is equal in depth to or deeper than said shallow groove surface and is shallower than said deep groove surface.

12. A magnetic head slider as claimed in claim 11, wherein a flying surface opposed to said magnetic disc includes a plurality of surfaces having different depths from each other, and each of positions when projecting each of said heat generating elements to said flying surface is included in a surface which is 100 nm or more deeper from a surface which comes closest to said magnetic disc.

13. A magnetic disc drive comprising:

a magnetic disc, including a recording track in which data is recorded;

a disc actuator configured to rotate said magnetic disc;

a magnetic head slider configured to fly above said rotating magnetic disc and configured to write and read the data, the magnetic head slider including:

a recording and reproducing element configured to write and read said data, a heat generating element arranged at least in one side in a width direction of said recording track with respect to said recording and reproducing element and configured to generate heat on the basis of an application of current, and a member interposed at least between said recording and reproducing element and said heat generating element, and configured to expand in correspondence to the heat generation of said heat generating element, and said recording and reproducing element is configured to move in a width direction of said magnetic head slider on the basis of said expansion;

a head suspension configured to support said magnetic head slider;

a head actuator configured to drive said head suspension so as to relatively move said magnetic head slider with respect to said magnetic disc;

a calculation circuit configured to calculate a position error of said recording and reproducing element with respect to said recording track on the basis of the data read by said recording and reproducing element;

a coarse motion control and track following control circuit configured to drive said head actuator in correspondence to the position error of said recording and reproducing element;

a fine tracking motion control circuit configured to excite said heat generating element in correspondence to the position error of said recording and reproducing element; and a flying surface opposed to said magnetic disc, including a plurality of surfaces having different depths from each other, including at least:

a step bearing surface;

a shallow groove surface, and a deep groove surface; and wherein each of a plurality of positions when projecting each of said heat generating element to said flying surface is included in a surface which is equal in depth to or deeper than said shallow groove surface and is shallower than said deep groove surface.

14. A magnetic head slider as claimed in claim 13, wherein said fine tracking motion control circuit is configured to control an amount of electric current or an amount of electric power of said heat generating element.

15. A magnetic head slider as claimed in claim 13, wherein said fine tracking motion control circuit includes a compensator configured to compensate a time lag of the displacement of the recording and reproducing element with respect to the current application to the heat generating element.

16. A magnetic head slider as claimed in claim 13, wherein said fine tracking motion control circuit is configured to increase and decrease an amount of electric current or an amount of electric power of said heat generating element from a reference amount of electric current or a reference amount of electric power, in correspondence to a position error of said recording and reproducing element.

17. A magnetic head slider as claimed in claim 13, wherein said heat generating element is arranged in each of both sides in the width direction of said recording track with respect to said recording and reproducing element, and said fine tracking motion control circuit is configured to selectively excite said plurality of heat generating elements in correspondence to the position error of said recording and reproducing element.

* * * * *